(12) United States Patent
Payyappilly et al.

(10) Patent No.: US 8,817,600 B2
(45) Date of Patent: Aug. 26, 2014

(54) PROTOCOL FALLBACK TECHNIQUE FOR WIRELESS DATA COMMUNICATIONS

(75) Inventors: Ajith T. Payyappilly, San Diego, CA (US); Srinivasan Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 744 days.

(21) Appl. No.: 12/621,062

(22) Filed: Nov. 18, 2009

(65) Prior Publication Data

US 2010/0177629 A1    Jul. 15, 2010

Related U.S. Application Data

(60) Provisional application No. 61/144,409, filed on Jan. 13, 2009.

(51) Int. Cl.
  *H04W 74/02* (2009.01)
  *H04W 76/02* (2009.01)
  *H04W 36/00* (2009.01)
  H04W 28/04 (2009.01)
  H04W 60/02 (2009.01)

(52) U.S. Cl.
  CPC ........ *H04W 76/027* (2013.01); *H04W 36/0066* (2013.01); *H04W 28/04* (2013.01); *H04W 60/02* (2013.01); *H04W 76/028* (2013.01)
  USPC .......................................... 370/225; 370/331

(58) Field of Classification Search
  CPC .................... H04W 36/0022; H04W 36/0066; H04W 74/02; H04W 28/04; H04W 60/02; H04W 76/027–76/028
  USPC .......................... 370/216–218, 221, 225, 228
  See application file for complete search history.

(56) References Cited

U.S. PATENT DOCUMENTS 6,212,175 B1 *  4/2001  Harsch ........................... 370/338
6,651,105 B1 * 11/2003  Bhagwat et al. ............... 709/239

(Continued)

FOREIGN PATENT DOCUMENTS

| WO | WO0161964 A1 | 8/2001 | |
| WO | WO0254788 A2 | 7/2002 | |
| WO | WO2006057815 | 6/2006 | |
| WO | WO 2007103496 A1 * | 9/2007 | ............... H04Q 7/38 |

OTHER PUBLICATIONS

Carlson, J. and Winslow, R., Point-to-Point Protocol Vendor Protocol, RFC 3772 (May 2004).*

(Continued)

*Primary Examiner* — Benjamin Lamont

(57) ABSTRACT

A wireless communications device is configured to establish a radio level session with a network at a relatively high or highest protocol level among a plurality of protocol levels supported. Upon failures in establishing, or during, a network level data session, the radio level session is closed. Thereafter, the device re-attempts to establish the network level session at a lower, fallback protocol level, by pretending it is a legacy device incapable of supporting the high protocol level. In this manner, the network is likely to follow a different procedure in establishing data communications, whereby an error that caused the failure is less likely to be repeated. As examples, error conditions in eHRPD data sessions result in fallback to HRPD or 1xRTT data sessions. A network based alternative embodiment implements protocol fallback via appropriate fallback instructions to the wireless device.

35 Claims, 19 Drawing Sheets

(56) References Cited

U.S. PATENT DOCUMENTS

| | | | |
|---|---|---|---|
| 6,785,549 | B2 | 8/2004 | Spartz et al. |
| 6,928,282 | B2 * | 8/2005 | Taniguchi ............... 455/433 |
| 8,027,309 | B2 * | 9/2011 | Kotecha et al. ............ 370/331 |
| 8,059,615 | B1 * | 11/2011 | Narendran et al. .......... 370/335 |
| 8,064,400 | B2 * | 11/2011 | Shaheen ................ 370/331 |
| 8,078,178 | B2 * | 12/2011 | Islam et al. .............. 455/445 |
| 2005/0073977 | A1 * | 4/2005 | Vanghi et al. ............. 370/335 |
| 2006/0221899 | A1 * | 10/2006 | Feder et al. ............... 370/331 |
| 2008/0014957 | A1 * | 1/2008 | Ore ..................... 455/452.1 |
| 2008/0049759 | A1 * | 2/2008 | Godavarti et al. ......... 370/395.5 |
| 2008/0089290 | A1 | 4/2008 | Coulas et al. |
| 2009/0073933 | A1 * | 3/2009 | Madour et al. ............ 370/331 |
| 2009/0132682 | A1 * | 5/2009 | Counterman .............. 709/220 |
| 2010/0027448 | A1 * | 2/2010 | Puthiyandyil et al. ........ 370/310 |

OTHER PUBLICATIONS

3$^{rd}$ Generation Partnership Project 2, Interoperability Specification (IOS) for Evolved High Rate Packet Data (eHRPD) Radio Access Network Interfaces and Interworking with Enhanced Universal Terrestrial Radio Access Network (E-UTRAN), 3GPP2 A.S0022-0 v1.0, Mar. 2009, pp. 1-192.*
3rd Generation Partnership Project 2, E-UTRAN—eHRPD Connectivity and Interworking: Core Network Aspects, 3GPP2 X.S0057-0 v1.0, Apr. 2009, pp. 1-154.*
International Search Report and Written Opinion—PCT/US2010/020946, International Search Authority—European Patent Office Apr. 26, 2010.

* cited by examiner

PROTOCOL FALLBACK TECHNIQUE FOR WIRELESS DATA COMMUNICATIONS

RELATED APPLICATIONS

Claim of Priority under 35 U.S.C. §119

The present Application for Patent claims priority to Provisional Application No. 61/144,409 entitled "A method of fallback to HRPD or 1xRTT data services when there is a failure establishing an eHRPD data session" filed Jan. 13, 2009, and assigned to the assignee hereof and hereby expressly incorporated by reference herein.

TECHNICAL FIELD

The present disclosure relates generally to wireless data communications.

BACKGROUND

In recent years, wireless communications technology available to mainstream users has undergone vast improvements in terms of data rates, quality, reliability, services offered, etc. With the advent of third generation (3G) technology, the public now widely enjoys mobile Internet, email, text messaging, video games, etc. on cell phone type devices. As technology advances, existing wireless protocols are updated and new ones are developed. Still, it is desirable to empower relatively older mobile equipment that operates according to earlier protocols, to function within updated networks operating with the latest protocols.

Over the past decade, there have been primarily two standards-based technologies for mobile communications: 3GPP-based technologies (also known as GSM/UMTS), and 3GPP2, which is CDMA based. GSM/UTMS is generally a TDM based technology, but also encompasses WCDMA (wideband CDMA). 3GPP2 type CDMA has evolved from the IS-95 standard based systems in the 1990's, to so-called 1xRTT or "cdma2000" (based on IS-856/IS-2000 standards) in the early 2000's. 1xRTT stands "for one times radio transmission technology" where the "1x" legend is used to denote the same bandwidth channel as IS-95, i.e., 1.25 MHz. 1xRTT is considered by some to be a 2.5G technology. Subsequently, a 3G technology called HRPD (High Rate Packet Data), also known as EVDO (Evolution-Data Optimized) was developed to succeed 1xRTT in the cdma2000 family, and has been widely deployed. HRPD provides higher data speeds than 1xRTT, typically 1.8-3.1 Mb/s versus 144kb/s for 1xRTT. HRPD also differs from 1xRTT in that its back-end network is entirely packet based, as opposed to the circuit based network of 1xRTT. HRPD has already undergone several revisions, i.e., Revs. 0, A and B.

In coming years, fourth generation (4G) technology, commonly known as Long Term Evolution (LTE), is expected to come of age. LTE is designed to provide yet higher data rates, higher efficient use of the radio network, and so on, to allow for enhanced multi-media services. The LTE evolution involves a transition to an all-IP core network with a simplified architecture and open interfaces. This requirement is defined by the System Architecture Evolution (SAE), which is the 3GPP specification for changes to the packet core network architecture. SAE is also known as Evolved Packet Core (EPC). GSM/UMTS based operators have a more natural evolution to LTE than do CDMA2000 operators.

Many CDMA2000-based operators are strategically migrating to an LTE network through a system known as 3GPP2 Evolved HRPD (eHRPD). With eHRPD, the mobile operator can upgrade their existing HRPD packet core network using elements of the SAE/EPC architecture. An objective is to provide seamless service mobility between HRPD and LTE access networks with a single mobility management protocol. eHRPD is being standardized as a method of interworking multiple access networks (eHRPD, E-UTRAN).

3GPP2 specifications such as 3GPP2 X.50057 and 3GPP2 A.S0022-0 have been developed and published to standardize the connectivity and interworking between E-UTRAN (LTE) and eHRPD. (E-UTRAN is the 3GPP Evolved Universal Terrestrial Radio Access Network.) The current interworking solutions, however, have not achieved perfection. Errors that may occur during data communication establishment and session procedures have led to a number of situations in which data communications fail and the subscriber simply cannot obtain desired data.

Accordingly, a need exists to improve interworking between wireless communications systems that are comprised of multiple protocol based equipment.

SUMMARY

A wireless communications device is configured with protocol fallback capability which allows for improved data service reliability. In an exemplary embodiment, the device establishes a radio level session with a network at a relatively high or highest protocol level among a plurality of protocol levels supported by the device and network. Upon a failure to establish a network level data communication session, or a failure during a network level session, the device closes the radio level session with the network. Thereafter, the device re-attempts to establish the network level session at a lower, fallback protocol level, by pretending that it is a legacy device incapable of supporting the high protocol level. In this manner, the network is likely to follow a different procedure in establishing data communications, whereby an error that caused the failure is less likely to be repeated.

As an example, the highest protocol level is an eHRPD protocol and a lower protocol level is an HRPD protocol or a 1xRTT protocol.

As another example, a secondary fallback from HRPD to 1xRTT may occur upon a failure in HRPD operation.

In an alternative exemplary embodiment, a network of a wireless communication system receives information from a wireless device indicative of a plurality of protocol levels supported by the device. The network attempts to establish a data communication session with the device at a relatively high protocol level among the protocol levels. Upon a failure to establish, or failure during, the data communication session, the network instructs the device to operate at a lower protocol level, and attempts to establish communications at the lower protocol level.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

Herein, the phrases "higher level protocol" or "higher protocol level" signify a protocol that is associated with relatively advanced data communication services. Thus, a network that operates in accordance with a higher level protocol is able to provide more advanced services than one operating according to a lower level protocol. More advanced services may comprise, e.g., faster data rates, improved quality, improved reliability, more multimedia options, etc. Additionally, a wireless device that is not configured to support a higher level protocol but does support a lower level protocol in the same protocol family (e.g. 3GPP2 or 3GPP) will be referred to herein as a "legacy device". By way of example but not limitation, eHRPD is considered a higher level protocol than HRPD, and HRPD is considered a higher level protocol than 1xRTT.

Certain exemplary embodiments of the invention will be described below in the context of an eHRPD wireless communication system interworking with a E-UTRAN/EPC system. These exemplary embodiments may solve particular problems associated with an eHRPD system. However, it should be understood that the invention may have applicability to other types of communication systems, and should not be construed as limited to the eHRPD application.

Figure 1:
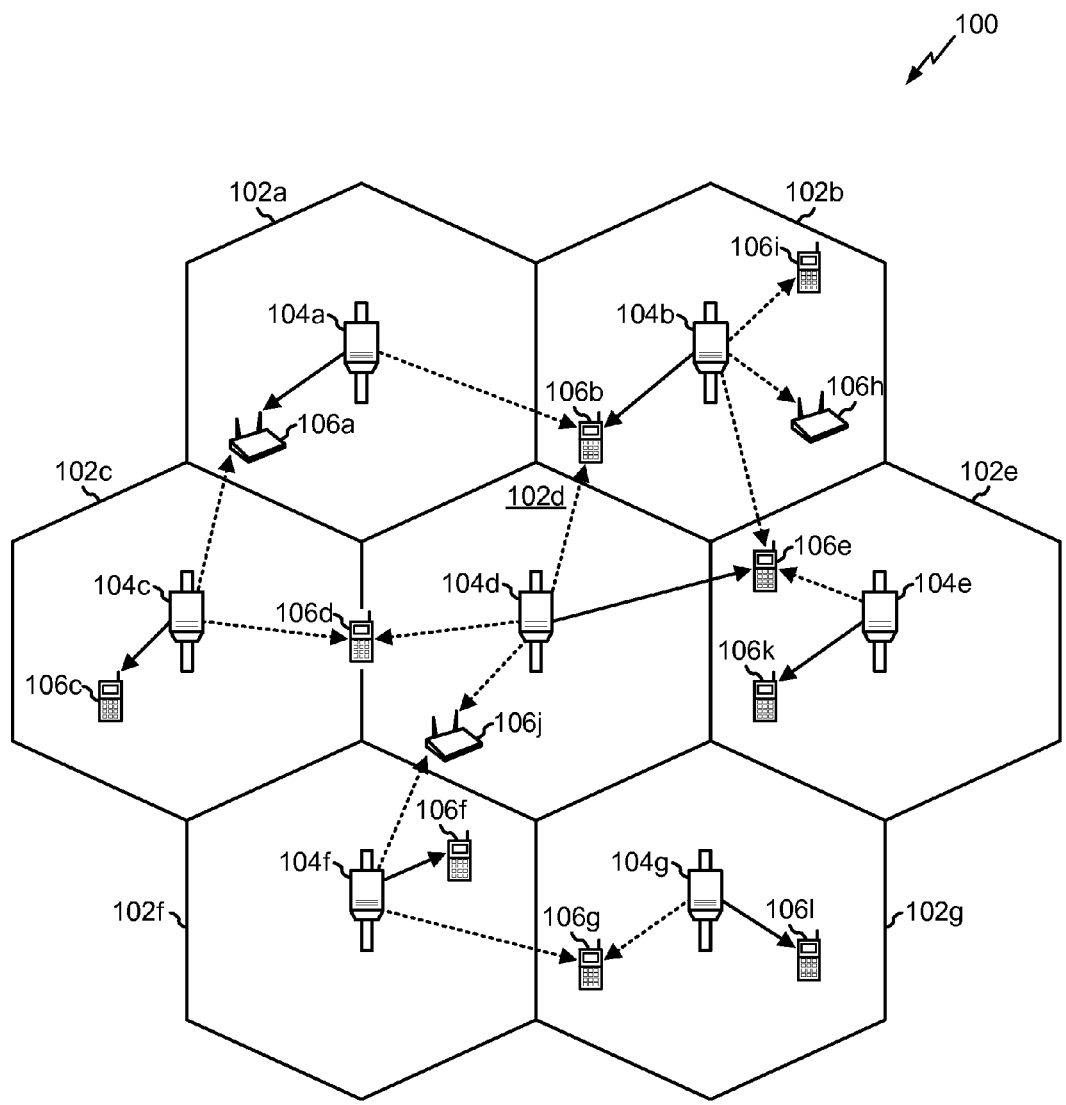
FIG. 1 illustrates a wireless communication system configured in accordance with an embodiment of the disclosure, in which network edge components are illustrated in a geographically distributed environment.

FIG. 1 illustrates a wireless communication system 100 configured in accordance with an embodiment of the disclosure, in which "network edge" components are illustrated in a geographically distributed environment. Network edge components include base transceiver stations (BTSs) and access terminals (ATs). The wireless communication system 100 provides communication for devices in multiple cells 102, such as, for example, macro cells 102a-102g, with each cell being serviced by a corresponding BTS, illustrated as BTSs 104a-104g in the figure. Each cell may be further divided into one or more sectors. Various ATs 106, illustrated as ATs 106a-106k, are dispersed throughout the system. The wireless communication system 100 may provide service over a large geographic region. For example, macro cells 102a-102g may cover a few city blocks in a neighborhood.

Any AT 106 may be a cellular phone, a laptop computer, a personal digital assistant, a wireless communication device, a subscriber unit, a netbook type device, and so on. In general, an AT 106 may also be called a wireless device, a user equipment (UE), a mobile station (MS), a mobile equipment (ME), a mobile terminal (MT), etc. However, in this description hereinafter, an AT will be referred to as an evolved AT (eAT) if it is configured to support an eHRPD protocol. In this description hereinafter, an AT that is not configured to support eHRPD will be considered a legacy device and simply referred to as an AT.

The various BTSs 104a-104g may have different capabilities in terms of the wireless protocols they support and hence the services they're able to provide to the wireless devices 106. For instance, in general, if an entire network is in the process of phasing in an upgrade from HRPD to LTE, base station and network equipment may be upgraded in one geographical area at a time. Thus, it's conceivable that a BTS as 104g serving cell 102g might have eHRPD capability while another BTS nearby (e.g., 104c) may only have 1xRTT capability. In any event, in general, as a BTS 104 and corresponding cell 102 is upgraded to a new protocol such as eHRPD, it typically maintains support for legacy protocols such as 1xRTT for a period of years thereafter.

Figure 2:
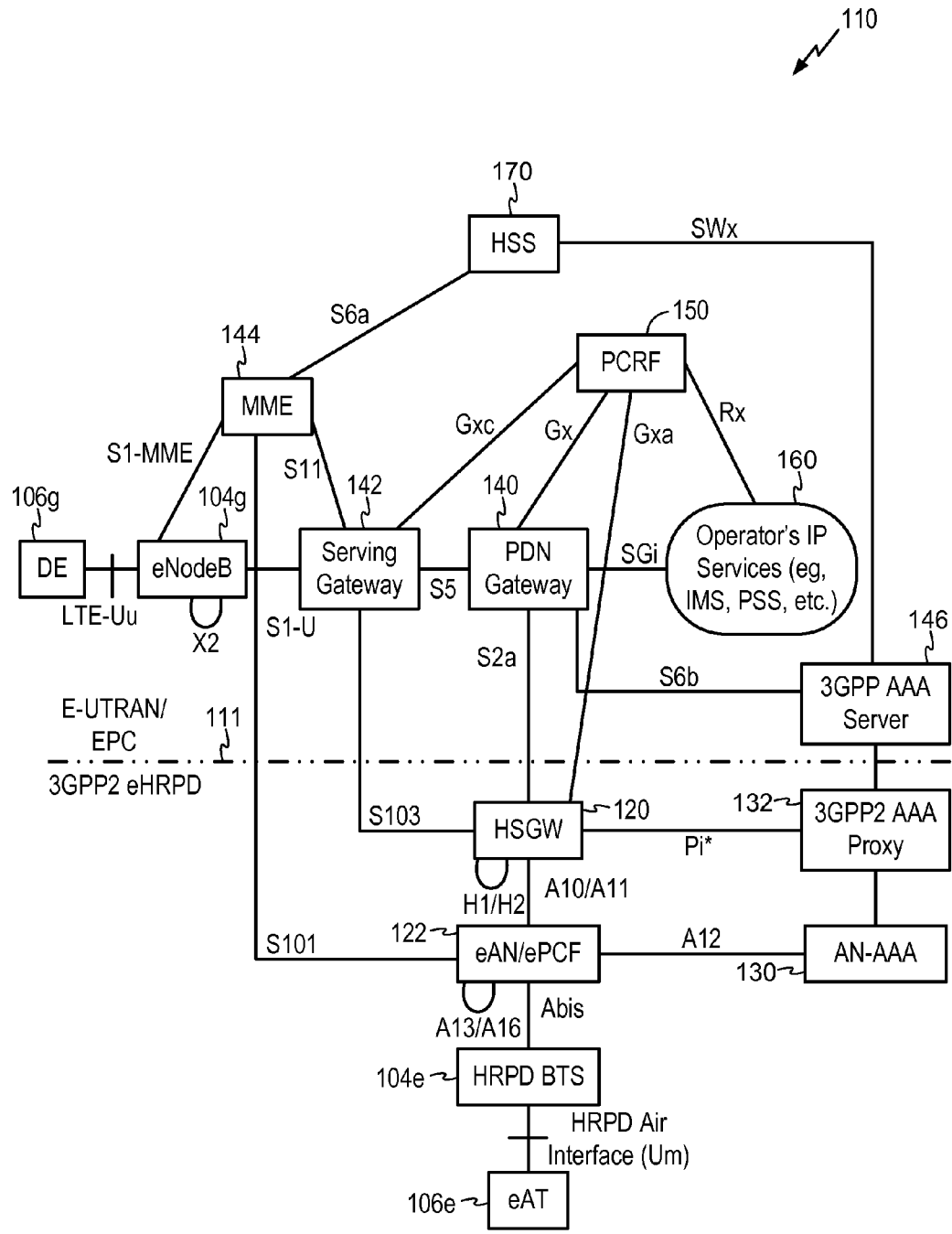
FIG. 2 is a functional block diagram illustrating a network architecture of the wireless communication system of FIG. 1. The architecture illustrates eHRPD and E-UTRAN/EPC interworking.

FIG. 2 is a functional block diagram illustrating a network architecture 110 of the wireless communication system 100 of FIG. 1. Network components shown in the upper half of the figure, i.e., above demarcation line 111, are E-UTRAN/Evolved Packet Core (EPC) network components. These components can collectively operate in a stand alone LTE network, i.e., without the components below line 111, to provide an all IP infrastructure. E-UTRAN/EPC components include a packet data network (PDN) gateway 140; a serving gateway (S-GW) 142; a mobile management entity (MME) 144; a Home Subscriber Server (HSS) 170; a 3GPP AAA (Authentication, Authorizing, Accounting) Server 146; a Policy and Charging Rules Function (PCRF) 150; and an Operator's IP Services entity 160. IP Services entity 160 provides advanced data services such as IP Multimedia (IMS) services and PSS services. Examples of such services include push-to-talk, video, gaming and enterprise security applications. LTE compatible UEs as UE 106g wirelessly communicate over a LTE-Uu air interface with an eNodeB type base station transceiver 104g. As shown, eNodeB 104g is coupled to MME 144 via a S1-MME interface, and to Serving Gateway 142 via a S1-U interface.

The general configuration and functionality of the shown E-UTRAN/EPC and eHRPD network components and interfaces (S11, S6a, Gxc, etc.) are known. These are described, e.g., in specification 3GPP2 X.S0057-0 v0.11.0, July 2008, which is incorporated herein by reference in its entirety. Embodiments described herein, however, may alter or enhance the configuration, functionality and processes of certain of these network components to implement the processes described. To the extent that the altered or enhanced functionality described in connection with the embodiments herein conflicts with the functionality described in known specification(s), the description herein takes precedent, to enable implementation of the embodiment(s).

The component blocks below line 111 are eHRPD component blocks collectively configured to operate in conjunction with LTE equipment. In the example presented, an evolved access terminal (eAT) 106e obtains data communication services via the eHRPD and EPC network components. (As will be described later, a legacy wireless device, i.e., an AT, can also obtain data services using the network architecture.) eAT 106e wirelessly communicates with HRPD BTS 104e by means of an HRPD Air Interface (also known as a "Um" interface). BTS 104e may be a conventional HRPD BTS that would normally interact with an access node (AN) and packet control function (PCF) in a stand alone HRPD network. In the eHRPD arrangement, however, HRPD BTS 104a is coupled to an eAN/ePCF (evolved access network/evolved packet function) 122, also known as an "evolved HRPD access network". eAN/ePCF 122 is coupled to an AN-AAA 130, MME 144 and an HRPD Serving Gateway (HSGW) 120. HSGW 120 is coupled to 3GPPP2 AA Proxy 132, Serving Gateway 142 and PDN Gateway 140. An HRPD Serving Gateway is generally a component that ensures converged mobility management between HRPD and LTE networks. HSGW 120 provides interworking between the evolved HRPD access network 122 and the PDN Gateway 140. Optionally, a Packet Data Serving Network (PDSN, not shown) of a legacy HRPD network can be integrated with or upgraded to HSGW 120.

A problem arises with the network architecture of FIG. 2 when operated according to conventional specifications such as 3GPP2 X.50057-0. That is, while establishing a data services session over eHRPD, if there is a failure for some reason at the PPP/IP level (explained more fully below) the user will essentially be "stuck" with no data services whatsoever. More specifically, since at the radio level, both the eAT and eAN are capable of eHRPD and there is no problem establishing the radio-level session, there is a deadlock. The user becomes mired without any data services because the failure is at the PPP/IP level. Exemplary embodiments of the invention described hereinbelow resolve or alleviate this condition, by allowing for a graceful fallback to HRPD or 1xRTT at the radio level.

Figure 3:
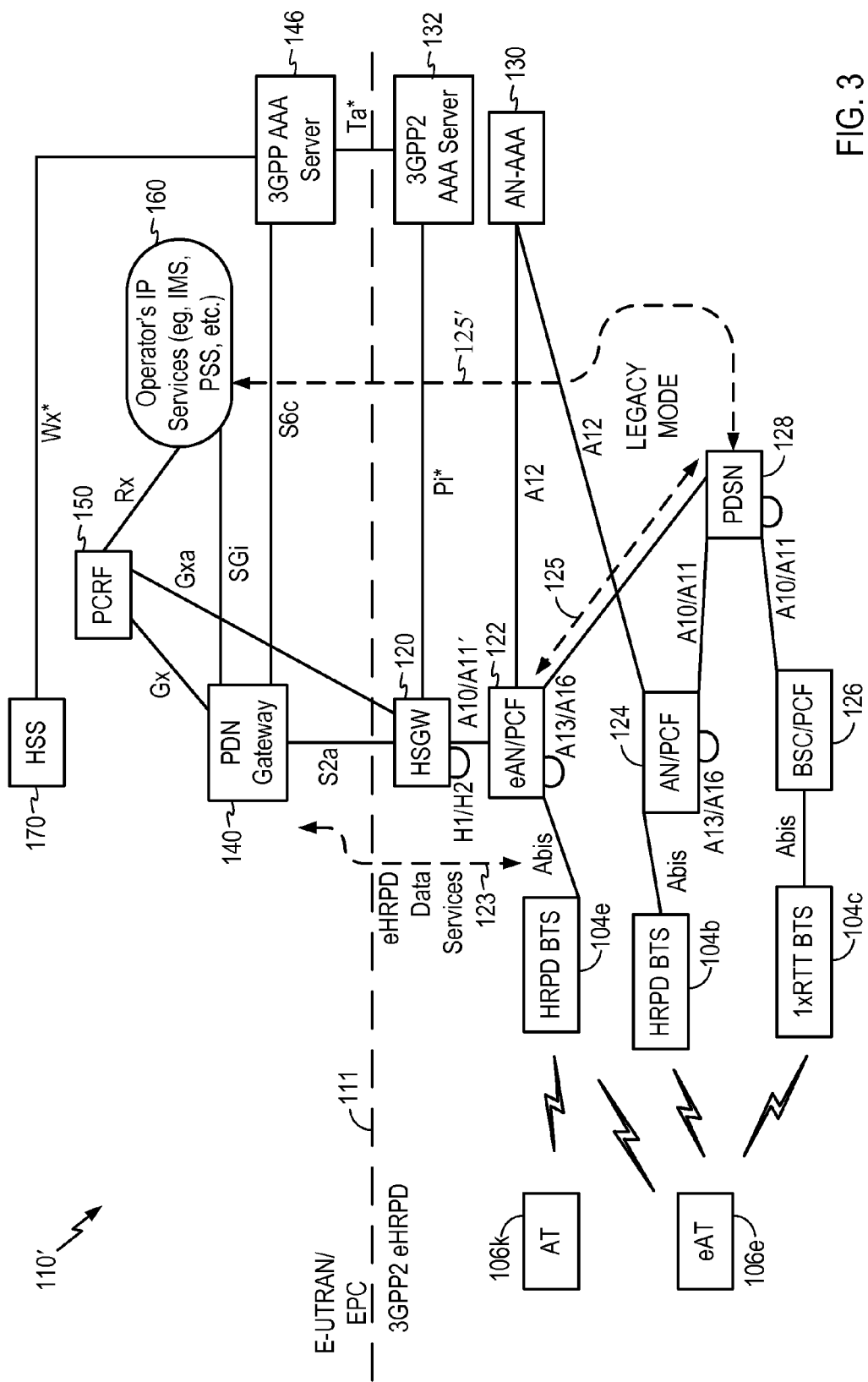
FIG. 3 is another functional block diagram illustrating a partial network architecture of the wireless communication system of FIG. 1, including optional legacy components.

FIG. 3 is a functional block diagram illustrating an architecture for a network 110' that may be employed in the wireless communication system 100 of FIG. 1. Network 110' includes legacy components to illustrate compatibility of eHRPD and E-UTRAN/EPC network components with older equipment. For simplicity, some of the E-UTRAN/EPC network components previously shown in network 110 of FIG. 2 are omitted from FIG. 3. It is understood that these omitted components can be included in network 110' and operate in the same manner as already described.

Network 110' includes, in addition to the network components (104e, 122, etc.) described above, a PDSN 128 which functions to provide data services to wireless devices operating in legacy mode. While shown as a separate entity coupled to eAN/PCF 122, PDSN 128 may in practice be integrated with HSGW 120. Network 110' further includes another HRPD BTS 104b, which is coupled to an access network/packet control function (AN/PCF) 124; the latter is in turn coupled to PDSN 128. A 1xRTT BTS 104c is coupled to a base station controller/packet control function (BSC/PCF) 126, which is in turn coupled to PDSN 128. HRPD BTS 104b, AN/PCF 124, 1xRTT BTS 104c and BSC/PCF 126 are not necessary for the implementation of certain embodiments of the disclosure involving eHRPD services, as will be explained.

For example, if an eAT 106e is in the vicinity of HRPD 104e and a channel is available, a radio level session may be established between them. In this case, eAT 106e advertises that it has eAT capability. In turn, HRPD BTS relays relevant information to eAN/PCF 122 and, if no errors occur, a relatively advanced data communication session, i.e., an eHRPD session, is established with eAT 106e through HSGW 120, PDN gateway 140 and Operator's IP Services entity 160. This data session is illustrated as pathway 123.

If, on the other hand, a legacy wireless device such as AT 106k is in the cell of HRPD BTS 104e, a radio level communication session may likewise be established with AT 106k. However, since AT 106k is not configured to support the eHRPD protocol, it is only able to obtain legacy type data services. In this case, eAN/PCF 122 recognizes the limitations of AT 106k and, instead of pursuing a data communications path through HSGW 120 and PDN gateway 140, it interacts with PDSN 128 to establish a legacy type data session. This is illustrated as paths 125 and 125'. That is, in the legacy data session, conventional HRPD type services are provided to AT 106k.

An eAT such as eAT 106e is capable of supporting a conventional HRPD and 1xRTT data communication session in addition to an eHRPD session. Thus, for example, eAT 106e may be in an area that only provides 1xRTT services, such as an area serviced only by BTS 104c. Here, a communication session is established between BTS 104c and eAT 106e, and BTS 104c provides 1xRTT services to eAT 106e via BSC/PCF 126 and PDSN 128. Similarly, if eAT 106e is in an area only serviced by HRPD BTS 104b, it can still obtain HRPD services, but not eHRPD services, via BTS 104b, AN/PCF 124 and PDSN 128.

As mentioned earlier, a problem with wireless networks providing eHRPD data services according to conventional standards is, if an error occurs while attempting to establish an eHRPD data session, or during a data session, the user may wind up with no data service at all. Embodiments described herein overcome this problem by means of an eAT such as eAT 106e "pretending" that it only supports a legacy protocol such as HRPD or 1xRTT. That is, under certain error conditions, eAT 106e terminates a radio level session with HRPD BTS 104e, and thereafter advertises itself as a legacy device (i.e., as an AT). BTS 104e and eAN/ePCF 122 then handle the communication session in the same manner as for AT 106k, i.e., by attempting to obtain HRPD data service (or in some cases, 1xRTT data service) through PDSN 128. In this scenario, when a PPP/IP level data call is originated by the eAT 106e, eAN/ePCF 122 sets up an A10-A11 link to PDSN 128 instead of to HSGW 120, and PDSN 128 is in turn connected to the 3GPP2 core network. Since a failure in the eHRPD network does not imply a failure in the HRPD network, the HRPD data call with eAN 106e will likely succeed on the 3GPP2 core. In this manner, even though the eAT is unable to obtain advanced eHRPD data services, it may be able to obtain legacy mode HRPD level services.

Figure 4:
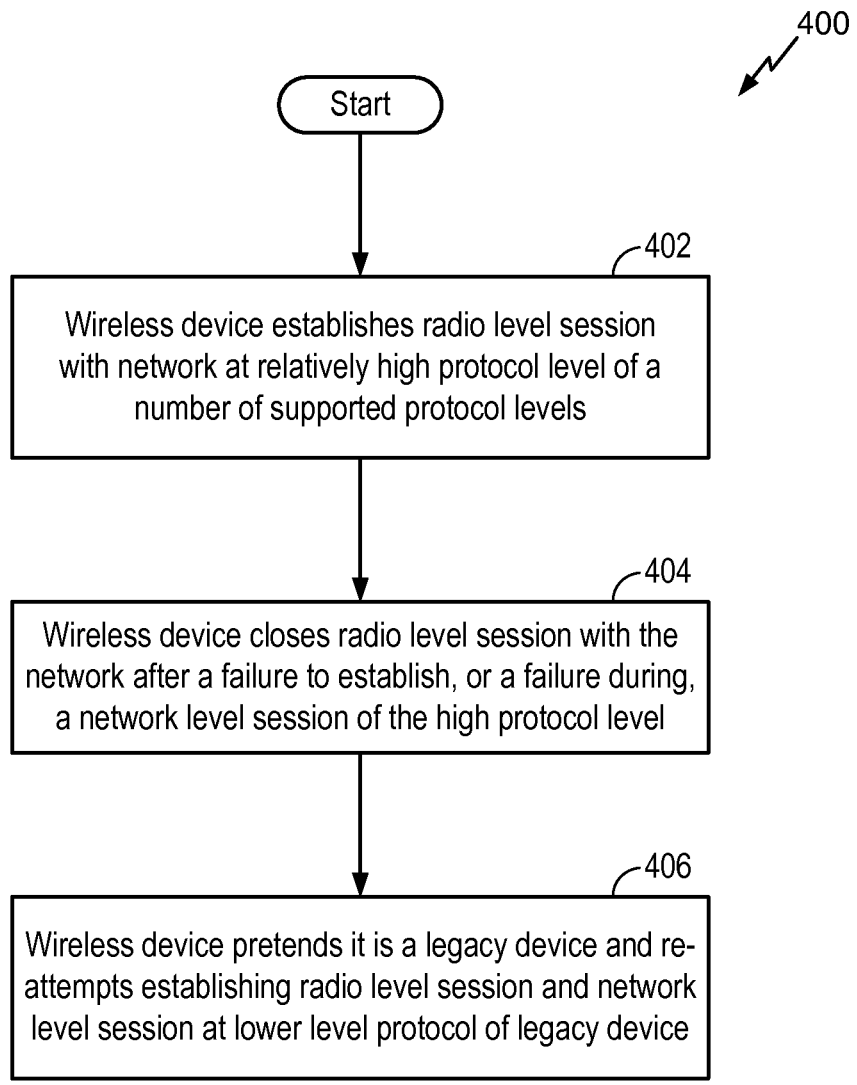
FIG. 4 shows a flow process to implement a protocol fallback technique in accordance with an embodiment of the disclosure.

FIG. 4 shows a flow process 400 to implement a protocol fall back technique in accordance with an embodiment of the disclosure. At first (step 402), a wireless device establishes a radio level session with a network at a relatively high protocol level among a number of protocol levels supported by the device and network. Once the radio level session is established, if a network level session at the high protocol level cannot be established, or is established and then fails, then the wireless device closes the radio level session (step 404). An example of a relatively high protocol level is an eHRPD protocol. An example of a radio level session at a high protocol level is an EVDO wireless connection between an eAT and a BTS linked to an eHRPD network, such as BTS 104e of FIG. 3. An example of a network level session is a PPP/IP level session anywhere between operator's IP services entity 160 at one end and BTS 104e or eAT 106e at the other end.

After the radio level session is closed, the wireless device at step 406 re-attempts establishing a radio and network level session by pretending it's a legacy device incapable of operation at the high level protocol. That is, the wireless device advertises itself as a device capable of communicating at only a lower level protocol, and incapable of supporting the high level protocol. In the example where a high level protocol is eHRPD, an example of a lower level protocol is HRPD or 1xRTT. In an example where a relatively high level protocol is HRPD, an example of a lower level protocol is 1xRTT.

As explained thus far herein, one aspect of the disclosure relates to a wireless device pretending to have lower protocol level capability than it actually has. Another aspect involves closing a radio level session upon the detection of errors in establishing a communication session at the network level. The following description provides examples of how a wireless device may perform such pretending activity. The description that follows also provides examples of error detection and implementations of ways to act upon errors such that data communications are still feasible.

Figure 5:
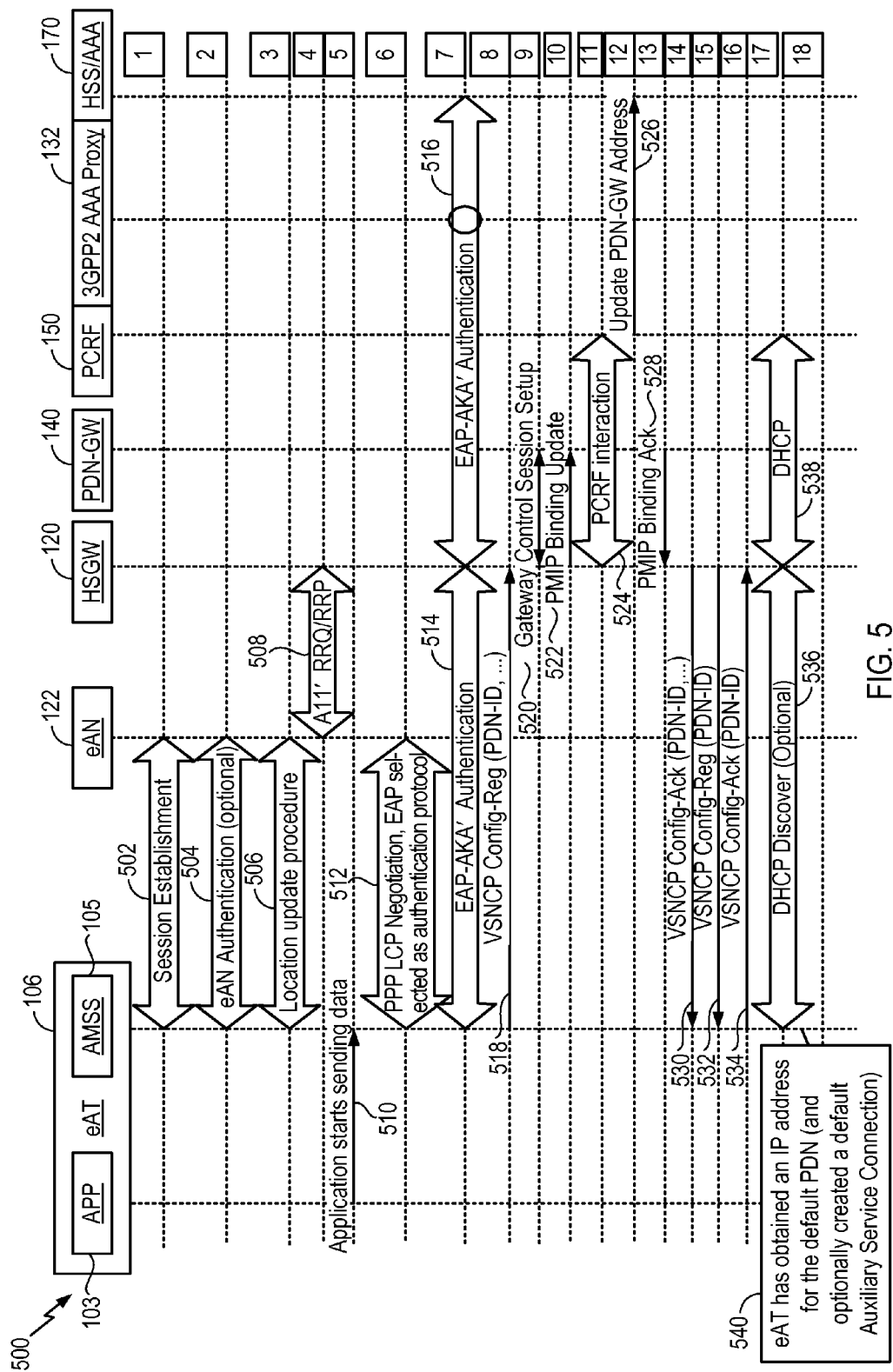
FIG. 5 illustrates a high level call flow for eHRPD data session establishment.

FIG. 5 illustrates a high level call flow 500 for eHRPD data session establishment. At various steps 1-18 in the call flow, failures are possible. Depending on the type of failure, it is possible, according to conventional procedures, for the user to be left with no data services. As mentioned, embodiments disclosed herein resolve this problem by providing a way to obtain legacy services despite the failure conditions.

As explained in connection with FIG. 3, an eAT 106 can be linked to an eAN/ePCF 122 via a HRPD BTS (not shown in FIG. 5). In FIG. 5, eAT 106 includes an application block (APP) 103 including software/firmware for carrying out legacy type operations. An Advanced Mobile Subscriber Software (AMSS) block 105 implements advanced software for eHRPD applications. A session establishment procedure 502 is first initiated between AMSS 105 and eAN 122. This is followed by an eAN authentication 504 and a location update procedure 506.

Intricacies of various flow steps 502 through 540 of call flow 500 can be found in specification 3GPP2 X.50057-0 mentioned earlier and incorporated herein by reference. However, certain steps of call flow 500 are altered in accordance with the embodiments described herein. To the extent that a conflict exists between the functionality described in 3GPP2 X.S0057-0 and the description herein, the functionality described in X.S0057-0 is considered irrelevant to this disclosure.

Figure 6A:
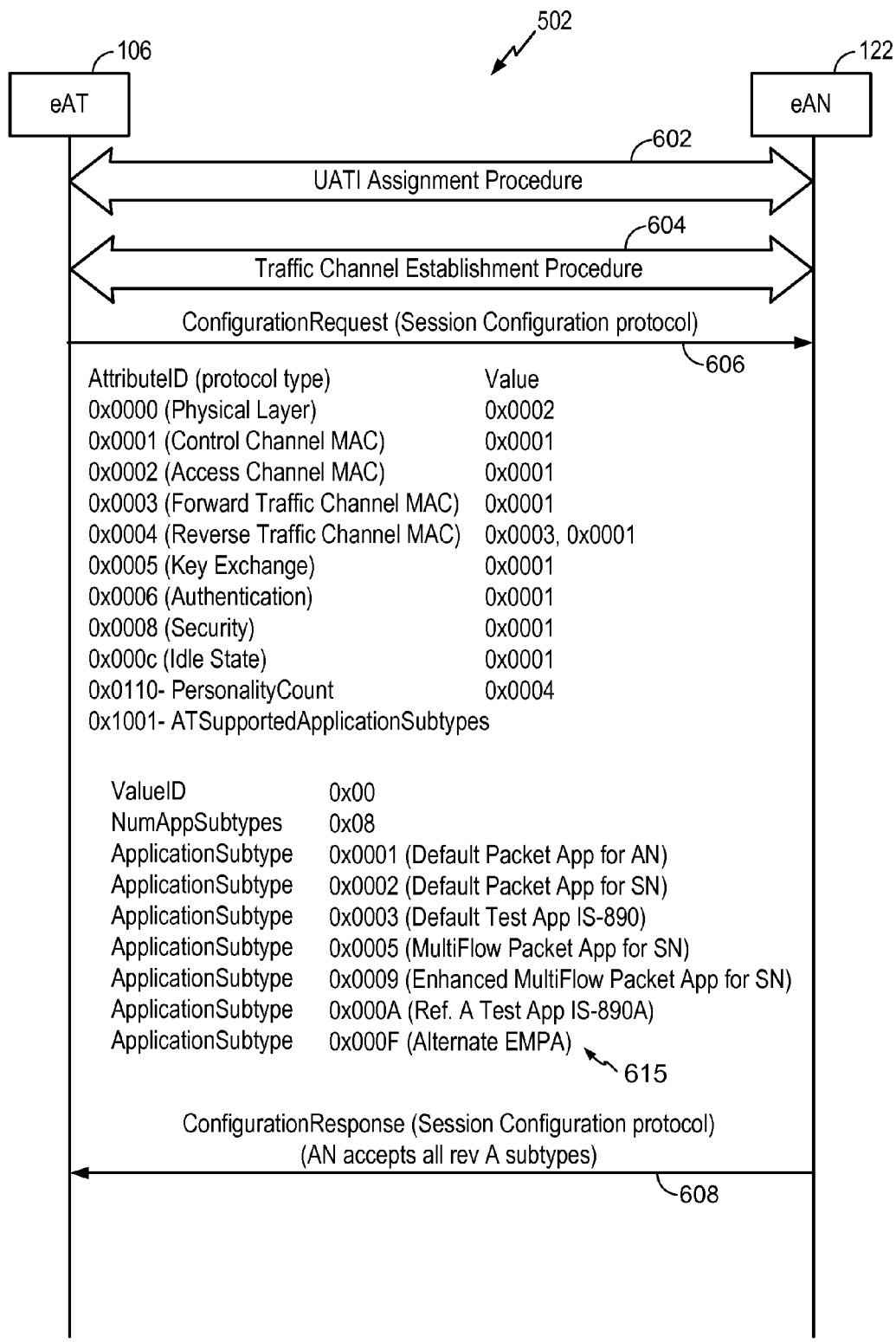
FIGS. 6A, 6B and 6C show an exemplary session negotiation between an eAT and an eAN, which is an implementation of a session establishment step of FIG. 5.
Figure 6B:
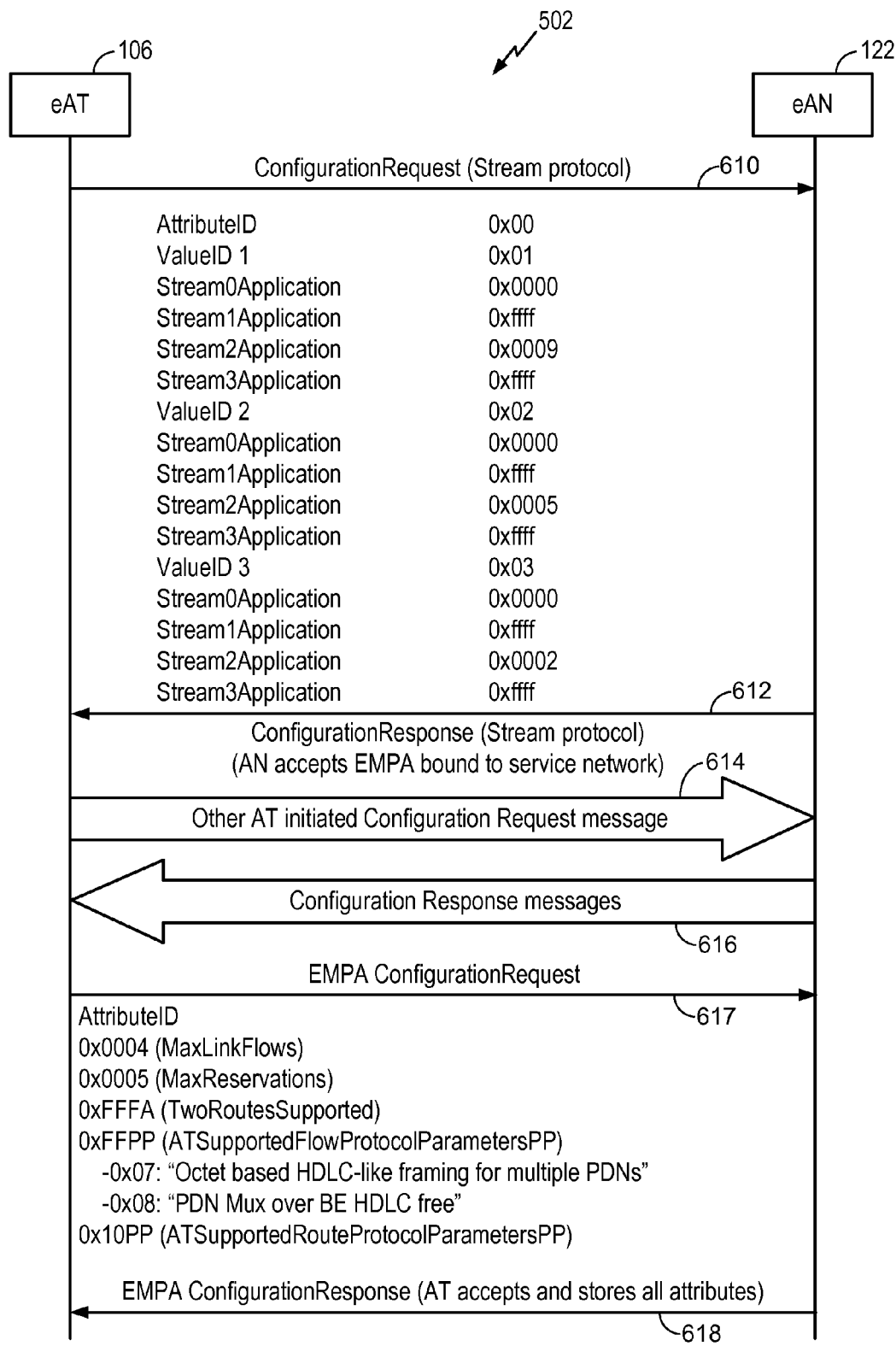
Figure 6C:
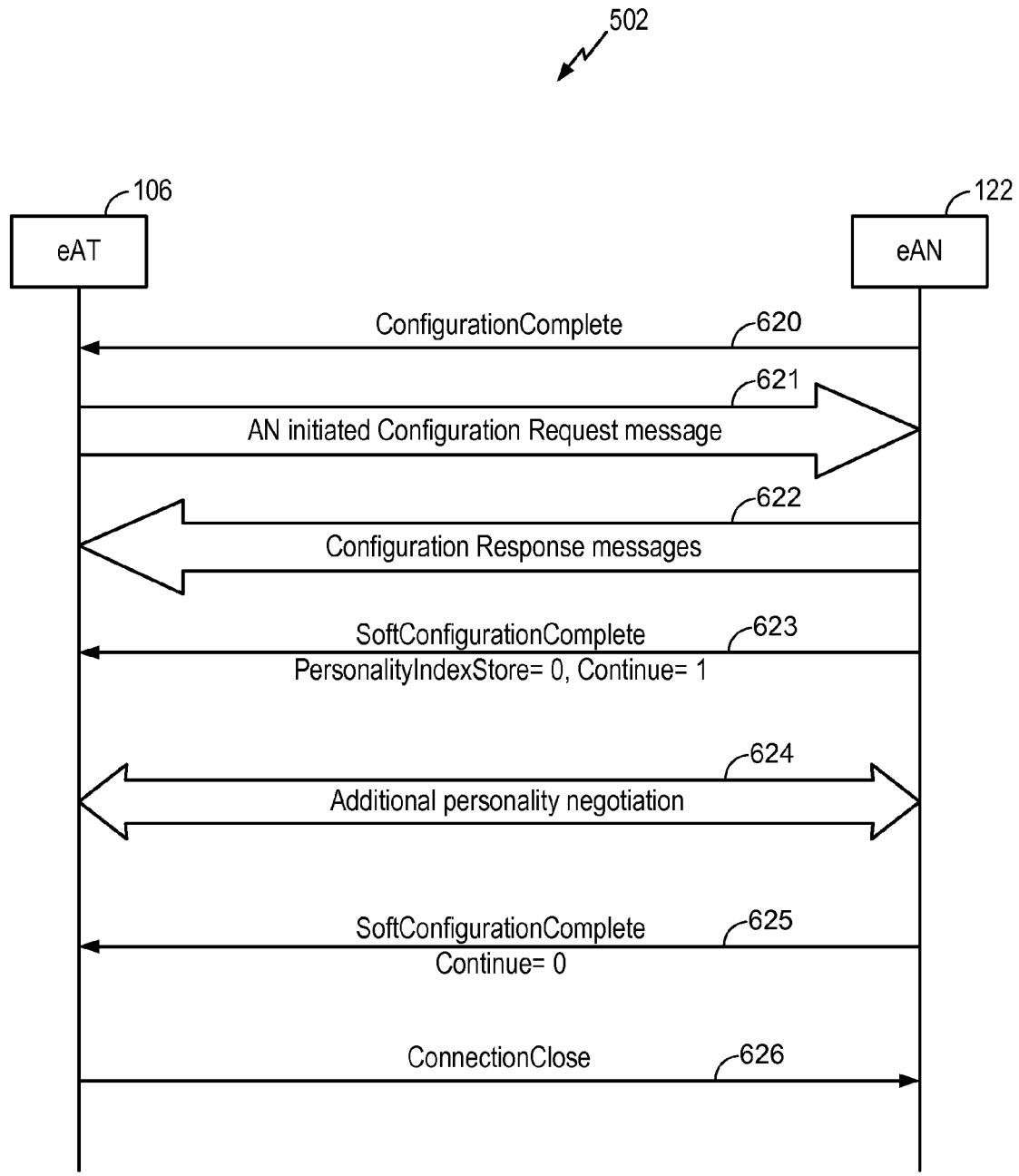

FIGS. 6A, 6B and 6C show an exemplary session negotiation between eAT 106 and eAN 122, which is an implementation of the session establishment step 502 of FIG. 5. In the negotiation, a Unicast Access Terminal Identifier (UATI) assignment procedure 602 is followed by a traffic channel establishment procedure 604. Next, a ConfigurationRequest (Session Configuration protocol) message 606 is sent from eAT 106. This message carries an indication of "personalities" supported by eAT 106. Each personality represents a specific protocol or protocol revision supported by eAT 106. In particular, if message 606 includes an appropriate value in an ApplicationSubtype field representing "Alternate EMPA", indicated at 615, this indicates that eAT 106e is capable of supporting the eHRPD protocol. (EMPA represents Enhanced Multi-flow Packet Application.) ConfigRequest message 606 also contains information representing protocol types for various channels such as a Physical Layer channel, a Control Channel MAC, an Access Channel MAC, and so forth.

In response to ConfigRequest message 606, eAN 122 returns a ConfigurationResponse message 608 for the Session Configuration protocol, informing eAT 106 whether or not it accepts the various application subtypes. Next, as shown in FIG. 6B, eAT 106 sends a ConfigurationRequest (Stream protocol) message 610. This message specifically sets forth the personalities supported by eAT 106. Four examples of personalities are as follows:

1. An eHRPD personality with EMPA, shown as valueID1 (0x01 in hexadecimal syntax);
2. An EVDO RevA personality with MFPA (Multi-flow Packet App), shown as valueID 2 in FIG. 6B;
3. An EVDO Rev0 personality with DPA (Default Packet App), shown as valueID 3 in FIG. 6B;
4. An EVDO RevB personality with MMPA (Multi-link multiflow Packet App), which is not shown in FIG. 6B, but is possible in chipsets supporting EVDO Rev-B.

Other protocols may also be specified as part of the personality, but for simplicity, only the packet apps have been set forth in the example. In general, based on the network's capability, the network tells eAT 106e which personality to use. In this case, since eAN 122 can support eHRPD, the network tells eAT 106 to pick Personality (1)—the eHRPD personality with EMPA as the packet app. This is shown in FIG. 6B as part of the Configuration Response message 612 from eAN 122 to eAT 106 ("AN accepts EMPS bound to service network"). Once the personality is decided, all the attributes corresponding to the various protocol versions specified in that personality are negotiated.

As mentioned earlier, when a particular data communication failure during an eHRPD session or session attempt occurs, eAT 106 may close the radio level EVDO session and thereafter, re-attempt data communication by pretending that is not an eAT (i.e., pretending that it does not support eHRPD). One of the ways it can do this is by not specifying a value for "Alternate Enhanced Multi-flow Packet Application (EMPA)" at field 615 of FIG. 6A, and by not specifying Personality 1 (ValueID1) as part of message 610 of FIG. 6B, even though in reality, the implementation on the eAT is capable of supporting it. Hence, the eAN 122 thinks eAT 122 is an AT and not an eAT capable of eHRPD. In this case, in the Configuration Response message 612, eAN 122 specifies one of the other personalities, depending on the capabilities of eAN 122. (Flow messages 614 through 626 in FIGS. 6B and 6C may then proceed, which are mostly typical session negotiation messages that occur in EVDO RevA. These messages occur in both HRPD and eHRPD, with the exception of part of EMPA ConfigurationRequest 617, i.e., messages labeled 0x07 and 0x08 are only supported in eHRPD.)

With continuing reference to FIG. 5, after step 3 (location update procedure 506) the radio session is established between eAT 106 and eAN 122. However, an eHRPD data session is not considered to be established until step 18 when the eAT obtains an IP address and is able to actually transfer data. Meanwhile, any of the steps between steps 4 and 18 (which are performed at the PPP/IP layer between the eAT 106 and the network) can fail. Some of these failures may be hard failures. As one example of such, in step 7 the Extensible Authentication Protocol Method for UMTS Authentication and Key Agreement (EAP-AKA') authentication may fail with the 3GPP AAA server 146 (see FIG. 3). In this case, if operating according to known specifications (e.g. 3GPP2 X.S0057-0), there are no means for the user to obtain data services. With embodiments of this disclosure, the user may obtain legacy data services in this case, albeit not necessarily the rich services available via the eHRPD route. For instance, eAT 106 may in this case close the radio session and thereafter pretend it's an AT to connect to the 3GPP2 core network (PDSN 128, etc.) using PAP/CHAP (Password Authentication Protocol / Challenge Handshake Protocol) authentication.

Exemplary embodiments of the disclosure identify potential error scenarios over eHRPD core network interaction and act upon these errors in an attempt to provide the user with data service. Each potential failure situation may be classified into "hard" or "soft" failures. A hard failure signifies that there is very little hope of recovering at a later time if another attempt is made. In this case, therefore, it is beneficial to immediately fall back into legacy HRPD or 1xRTT mode.

In the case of soft failure, there is a better possibility that the same step which caused the failure might succeed upon a retry attempt, either immediately or at a later time. Therefore, in considering a soft failure error condition, it may be preferable not to fall back into legacy HRPD or 1xRTT mode immediately, but instead wait for a number of retries first.

For both hard and soft failures, the eAT 106 can employ specific retry procedures for the different failure scenarios and potentially execute fallback procedures as described below after the retry attempts have become exhausted.

Referring again to FIG. 5, after the location update procedure 506, a A11'/RRQ/RRP negotiation 508 occurs between eAN 122 and HSGW 120. Thereafter, application block 103 of eAT 106 starts sending data at step 510. Next, a Point to Point Protocol (PPP) Link Control Protocol (LCP) negotiation 512 takes place between eAT 106 and eAN 122, with EAP (Extensible Authentication Protocol) selected as an authentication protocol. EAP-AKA' Authentication processes 514 and 516 then occur between (eAT 106 and HSGW 120) and (HSGW 120 and HSS/AAA 170), respectively. During the negotiation 512 and authentication processes 514 and 516, error conditions may occur that may prevent the desired data communication session from proceeding.

FIGS. 7-13 each illustrate an exemplary flow process or processes in which an error condition occurs during an eHRPD call establishment attempt and action is taken to provide data service to an eAT user despite the error. In these figures, whenever an eAT is said to fall back to a HRPD/1xRTT operating mode, it may accomplish this by the techniques discussed above. I.e., the eAT may close the radio level session and thereafter, initiate a new radio level session by pretending it is a legacy (AT) device rather than an eAT. FIGS. 7-10D address errors that occur during an LCP phase of PPP. FIGS. 11-15 address errors occurring during a VSNCP (Vendor Specific Network Control Protocol) phase of PPP.

Figure 7:
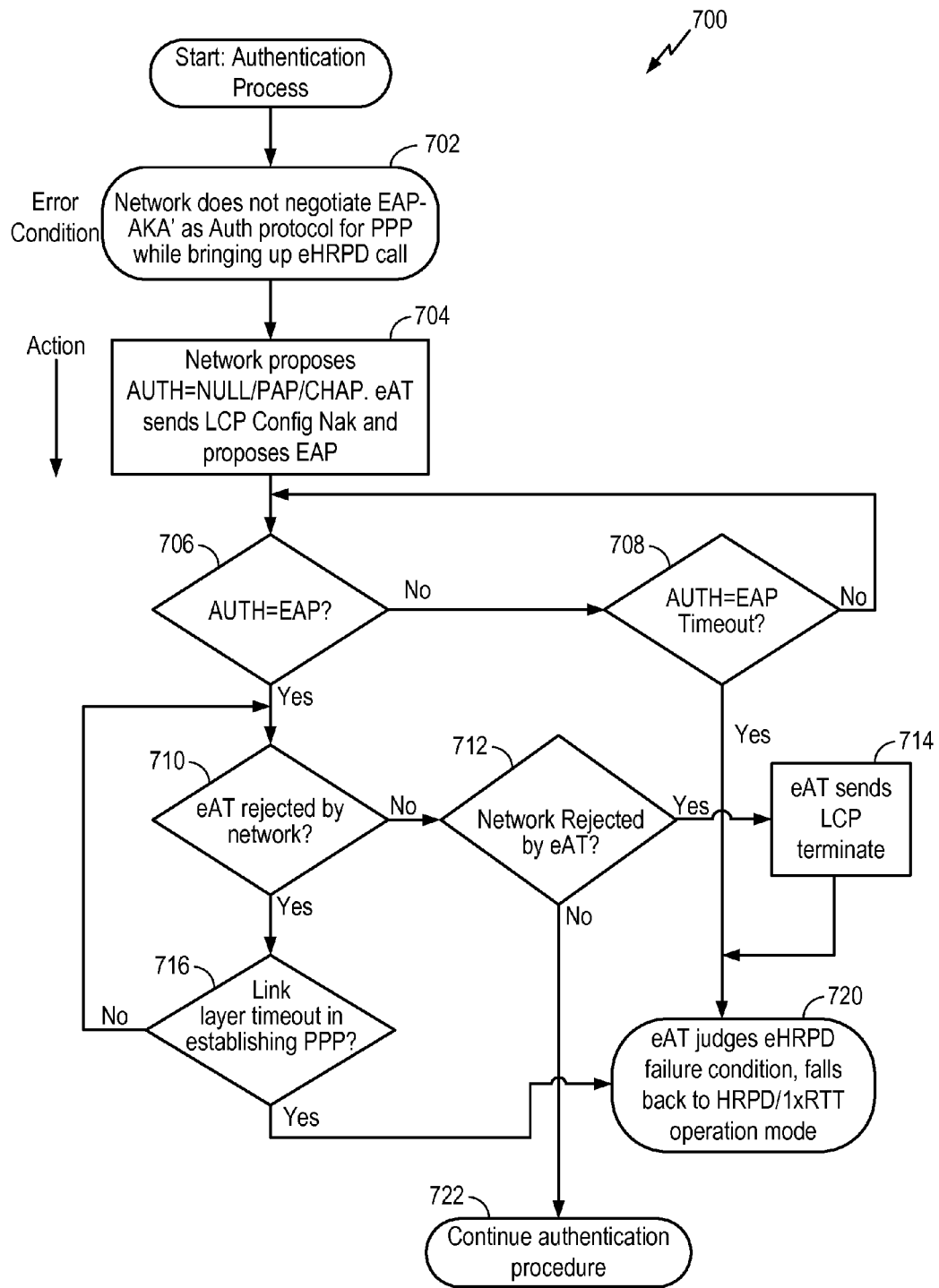
FIG. 7 illustrates a flow process in accordance with an embodiment, for identifying an error condition during an eHRPD call attempt and attempting to provide fallback data service despite the error condition.

FIG. 7 illustrates a flow process in accordance with an embodiment for identifying an error condition during an eHRPD call attempt and attempting to provide fallback data service despite the error condition. The error condition occurs during the PPP LCP negotiation phase 512 or the EAP-AKA' authentication processes 514, 516 just mentioned. Specifically, at 702, an error condition is identified in which the network does not negotiate EAP-AKA' as the authentication protocol for PPP while bringing up an eHRPD call. Rather, at step 704, the network proposes a PAP/CHAP authentication ("AUTH=NULL/PAP/CHAP"). In response, the eAT sends LCP Config Nak (i.e., the eAT does not acknowledge a PAP/CHAP authentication) and continues to propose EAP for the authentication protocol.

Next, at step 706 if the network does not confirm the EAP authentication protocol (AUTH=EAP), the flow proceeds to step 708. Here, the eAT determines if a timeout condition for the EAT authentication verification has occurred. If so, the process gives up on attaining EAP authentication and the flow proceeds to step 720. At 720, the eAT ascertains that an eHRPD failure condition has occurred. The eAT then falls back to the HRPD or 1xRTT operation mode in the manner described previously. That is, the eAT closes the radio level session and thereafter, pretends it is an AT to obtain legacy HRPD/1xRTT data services.

In step 706, if the network confirms EAP authentication protocol, the flow proceeds to step 710. If at 710 the eAT is nonetheless rejected by the network, then at step 716, the eAT determines if a link layer timeout in establishing PPP has occurred. Unless the network accepts the eAT before the timeout does occur (as indicated by the return to 710), the timeout results in the judgment of an eHRPD failure condition at 720 and the consequent fallback to HRPD/1xRTT operation mode.

If at 710 the eAT is not rejected by the network, then a determination is made at step 712 as to whether the network is rejected by the eAT. If yes, then at step 714, the eAT sends the network an LCP terminate instruction and the eHRPD failure condition occurs at 720. In step 712, if the network is not rejected then the authentication procedure continues at step 722 using the EAP authentication protocol.

Figures 8, 9:
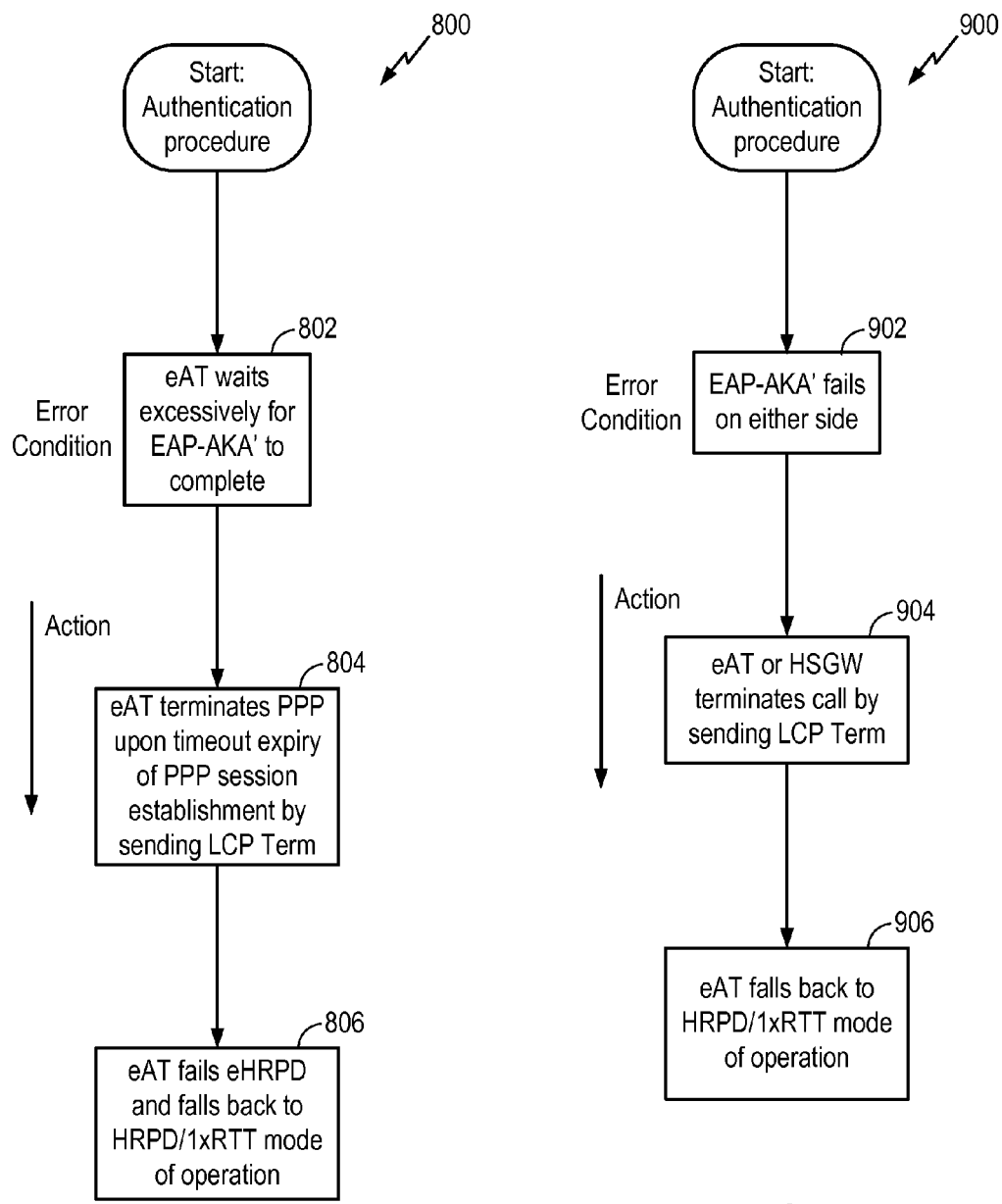
FIG. 8 shows another flow process in accordance with an embodiment for identifying and acting upon an authentication session error condition during an eHRPD call attempt.
FIG. 9 shows still another flow process in accordance with an embodiment for identifying and acting upon an authentication session error condition during an eHRPD call attempt.

FIG. 8 shows another flow process 800 in accordance with an embodiment for identifying and acting upon an authentication session error condition during an eHRPD call attempt. During authentication negotiations (steps 514, 516 of FIG. 5) an error condition occurs at step 802 in which the eAT waits excessively for EAP-AKA' authentication process to complete. An EAP-AKA' authentication process is described in specification 3GPP2 X.S0057-0. Generally, the eAT as an EAP Peer and the 3GPP AAA as an EAP Authentication Server mutually authenticate each other using EAP-AKA' procedures. Upon successful authentication, if the eAT is authorized to access the network, the 3GPP AAA sends a Master Session Key (MSK) to the HSGW which acts as the EAP authenticator.

The eAT considers the excessive wait in step 802 an error condition and takes action in step 804 by terminating PPP upon a timeout expiry of the PPP session establishment. The termination involves transmitting an LCP Termination instruction to the network. At step 806, the eAT fails eHRPD mode and falls back to HRPD/1xRTT operating mode.

FIG. 9 shows still another flow process 900 in accordance with an embodiment for identifying and acting upon an authentication session error condition during an eHRPD call attempt. During authentication negotiations (steps 514, 516 of FIG. 5) at step 902 an error condition occurs in which the EAP-AKA' authentication attempt fails on either side (i.e., at the eAT side or the network side). Network side failure may occur, for example, at HSGW 120 or the HSS/AAA 170. At step 904, the eAT or HSGW then terminates the call by sending the LCP Termination command. The eAT thereafter in step 906 falls back to HRPD/1xRTT operating mode.

FIGS. 10A-10D illustrate processes in accordance with respective embodiments for identifying and resolving fast re-authentication session error conditions during eHRPD call attempts. Fast re-authentication is a known procedure which uses keys derived on the previous full authentication. In general, a 3GPP AAA server indicates the fast re-authentication for EAP-AKA' to an eAT by sending a re-authentication identity to the eAT.

Figure 10A:
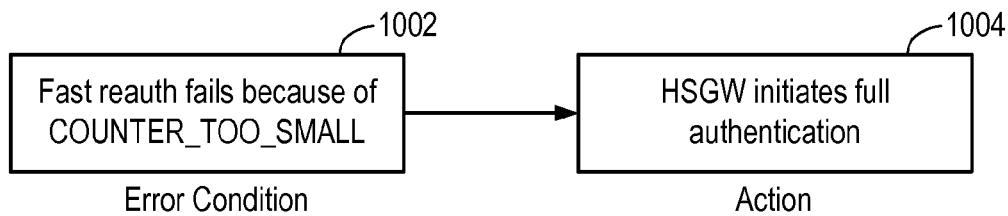
FIGS. 10A-10D show flow processes in accordance with respective embodiments for identifying and acting upon Fast re-authentication session error conditions during eHRPD call attempts.

Referring to FIG. 10A, an error condition is identified at step 1002 in which a Fast re-authentication fails due to a COUNTER_TOO_SMALL indication. This error condition may be considered a type of soft failure. As such, the HSGW may react by initiating a full authentication procedure, as shown at step 1004.

Figure 10B:
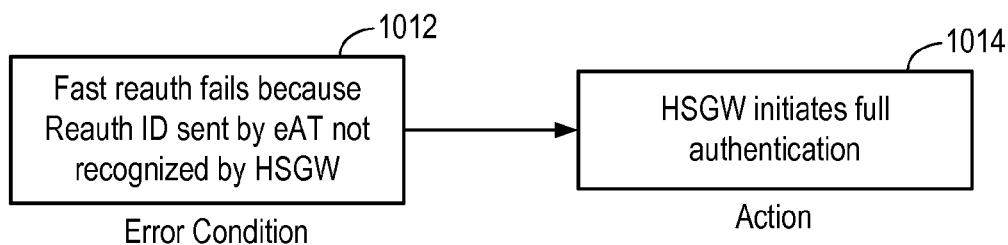

Referring to FIG. 10B, an error condition is identified in step 1012 in which a Fast re-authentication fails because a Re-authorization ID sent by the eAT is not recognized by the HSGW. Here, again, this error condition may be considered a type of soft failure. The HSGW may react by initiating full authentication at step 1014.

Figure 10C:
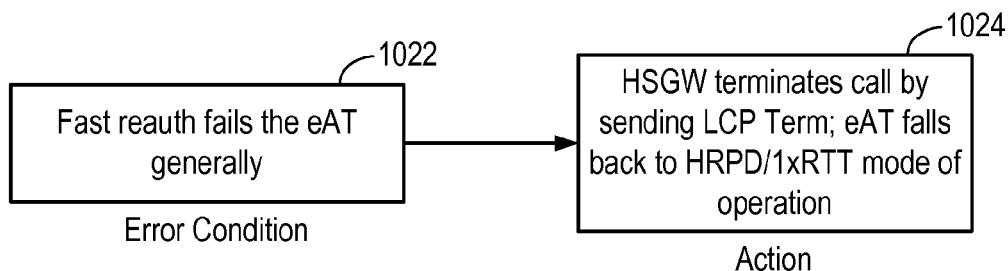

In the flow process of FIG. 10C, an error is identified at step 1022 in which a Fast re-authentication procedure between the network and the eAT fails the eAT generally, i.e., for a reason other than the error conditions at 1002 and 1012 of FIGS. 10A and 10B, respectively. This may be considered a hard failure condition, such that the HSGW terminates the call by sending a LCP Termination message at step 1024. The eAT falls back to HRPD/1xRTT mode in this case at step 1024.

Figure 10D:
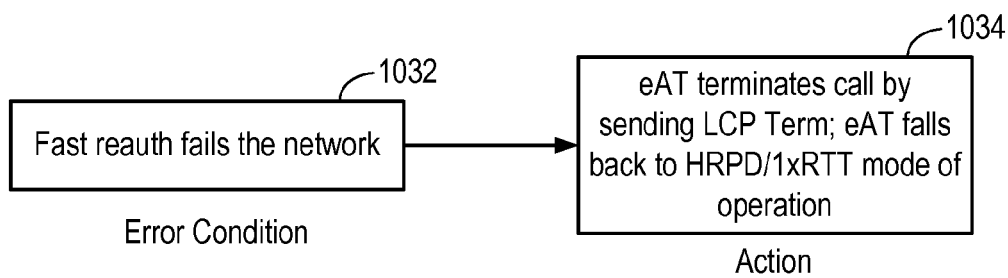

In the flow process of FIG. 10D, at step 1032 an error condition is identified in which a Fast re-authentication procedure between the network and the eAT fails the network. The eAT reacts to this error at step 1034 by terminating the call via sending an LCP Termination message. The eAT also falls back to the HRPD/1xRTT operating mode.

Referring again to FIG. 5, once a successful EAP-AKA' Authentication takes place in step 7, a series of messages are sent back and forth in a VSNCP (Vendor Specific Network Control Protocol) negotiation process phase of PPP in steps 8-18. Errors may occur during these steps, which may be acted upon according to embodiments of the disclosure to be described. During the VSNCP phase, at step 8 the eAT 106 sends a VSNCP Config-Req message 518 to HSGW 120, requesting a Packet Data Network identification (PDN-ID). This message is followed by a Gateway Control Session Setup 520, a PCRF interaction 524, an Update PDN-GW Address 526 and a PMIP Binding Ack 528 in steps 9-13. Next, a VSNCP Config-Ack 530 and VSNCP Config-Req 532 are sent by HSGW 120 to eAT 106, which responds with a VSNCP Config-Ack 534. At step 17, an optional DHCP Discover negotiation 536 occurs between eAT 106 and HSGW 120; and a DHCP session 538 occurs between HSGW 120 and PCRF 150. At this point, as indicated at 540, if no fatal errors have occurred, the eAT has obtained an IP address for the default PDN (and optionally created a default Auxiliary Service Connection).

FIGS. 11-15 each illustrate a flow process in accordance with a respective exemplary embodiment, for identifying and acting upon one or more error conditions occurring during a VSNCP process phase of an eHRPD call attempt.

Figure 11:
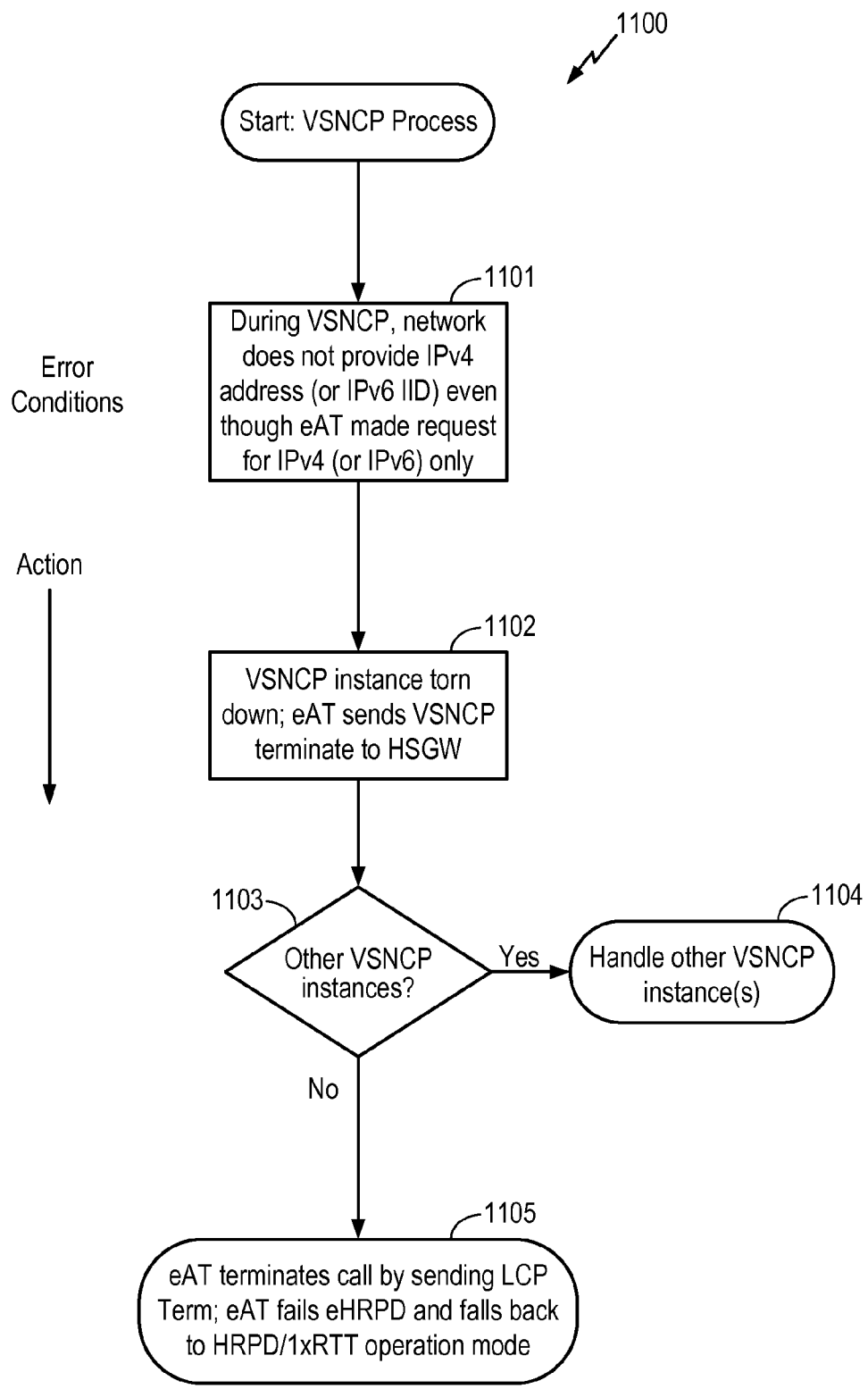
FIGS. 11-15 each illustrate a flow process in accordance with a respective embodiment, for identifying and acting upon one or more error conditions occurring during a VSNCP process of an eHRPD call attempt.

Referring to FIG. 11, exemplary flow process 1100 occurs during a VSNCP process phase. At step 1101, a first error condition may occur wherein the network does not provide the eAT with an IPv4 address, even though the eAT made a specific request for an IPv4 address. A second error condition may occur in which the network does not provide the eAT with an IPv6 IID address, even though the eAT made a specific request for IPv6. With either of these error scenarios, flow process 1100 reacts at step 1102 by tearing down the VSNCP instance. To this end, the eAT sends a VSNCP terminate instruction to the HSGW. Next, at step 1103, it is determined if there are any other VSNCP instances. If so, these are handled at step 1104. If not, the eAT terminates the eHRPD call by sending an LCP Terminate instruction at 1105. The eAT thus fails the eHRPD session and falls back to the HRPD/1xRTT operating mode at 1105 as described previously.

Figure 12:
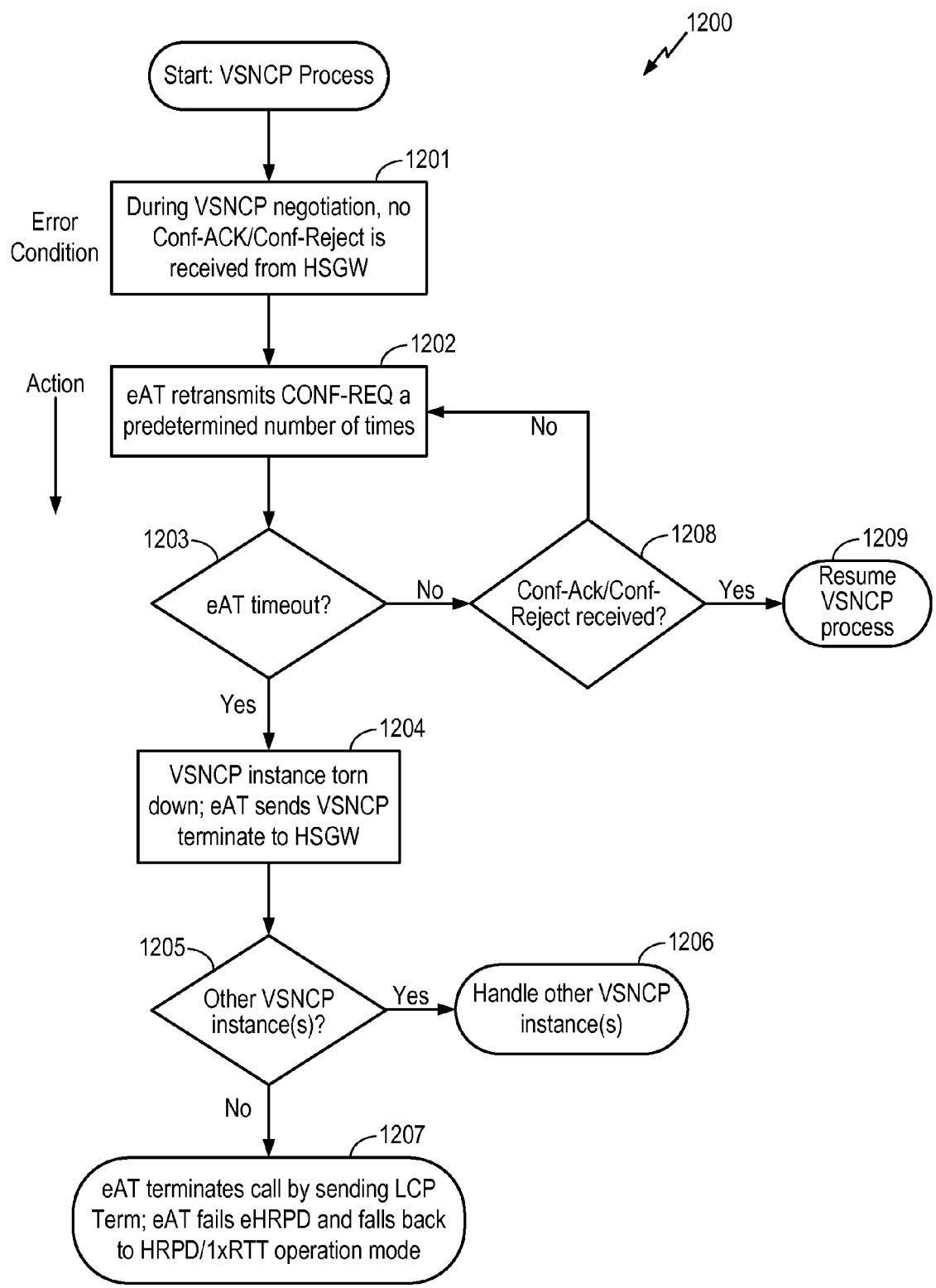

FIG. 12 illustrates another exemplary flow process 1200 that occurs during a VSNCP process phase. At step 1201, during VSNCP negotiation, an error condition occurs wherein no Conf-ACK or Conf-Reject message is received by the eAT from the HSGW (see messages 530 and 532 of FIG. 5.) The eAT reacts to this error at step 1202 by retransmitting CONF-REQ (see item 518 of FIG. 5) a predetermined number of times. The retransmission may occur until an eAT timeout occurs at step 1203. If, in the interim, a Conf-Ack/Conf-Reject message is received before a timeout occurs (step 1208), then the flow process resumes normal VSNCP process at step 1209. If a timeout does occur at 1203, then the flow proceeds to steps 1204-1207 (VSNCP instance torn down, etc.) which are the same as steps 1102-1105 of FIG. 11.

Figure 13:
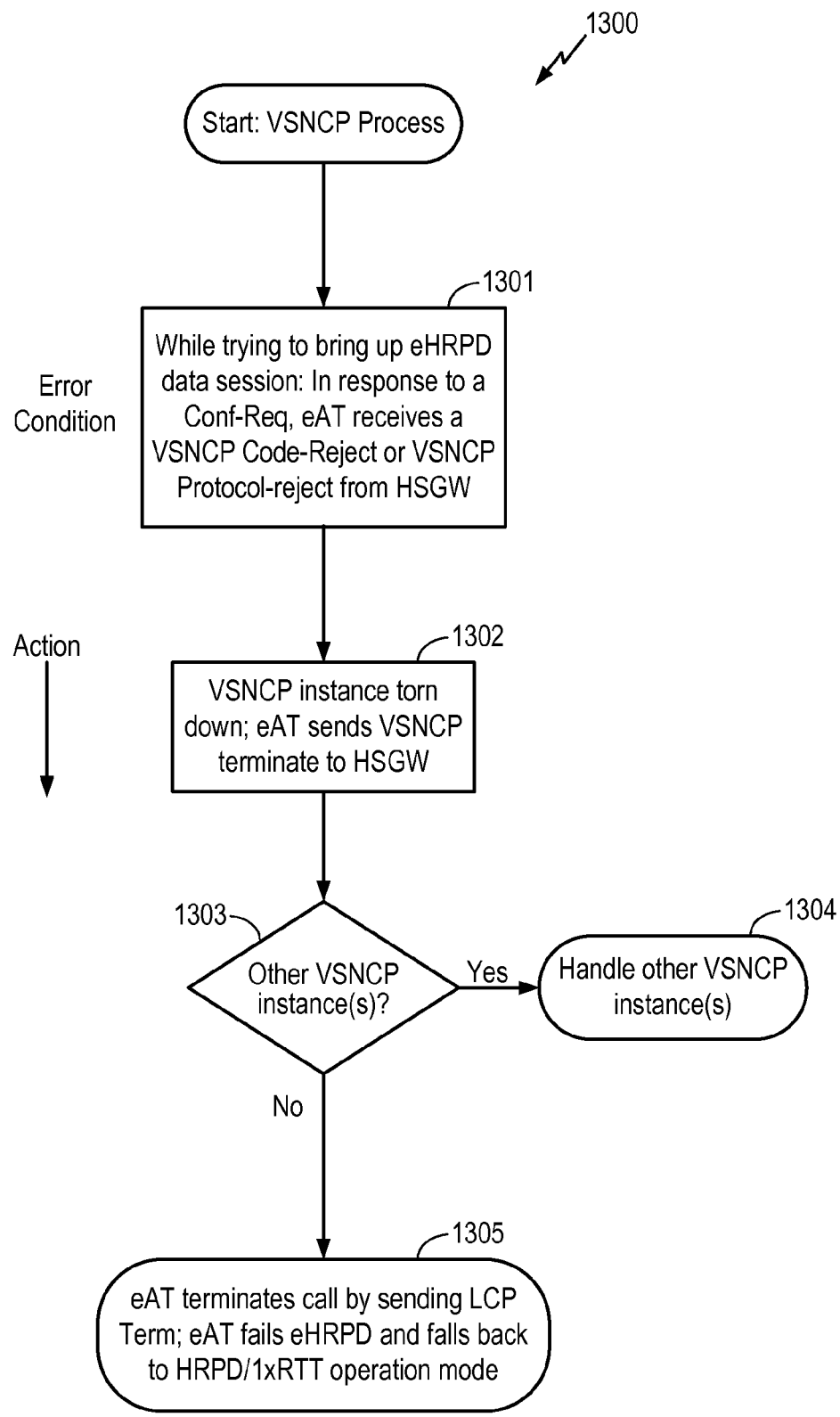

FIG. 13 illustrates still another exemplary flow process 1300 occurring at a VSNCP process phase. At step 1301, an attempt is made to bring up an eHRPD data session. In response to a Conf-Req, the eAT receives a VSNCP Code-Reject or a VSNCP Protocol-reject from the HSGW. In response to this error condition, the VSNCP instance is torn down, and so forth, at flow steps 1302-1305 which are the same as steps 1102-1105 of FIG. 11.

Figure 14:
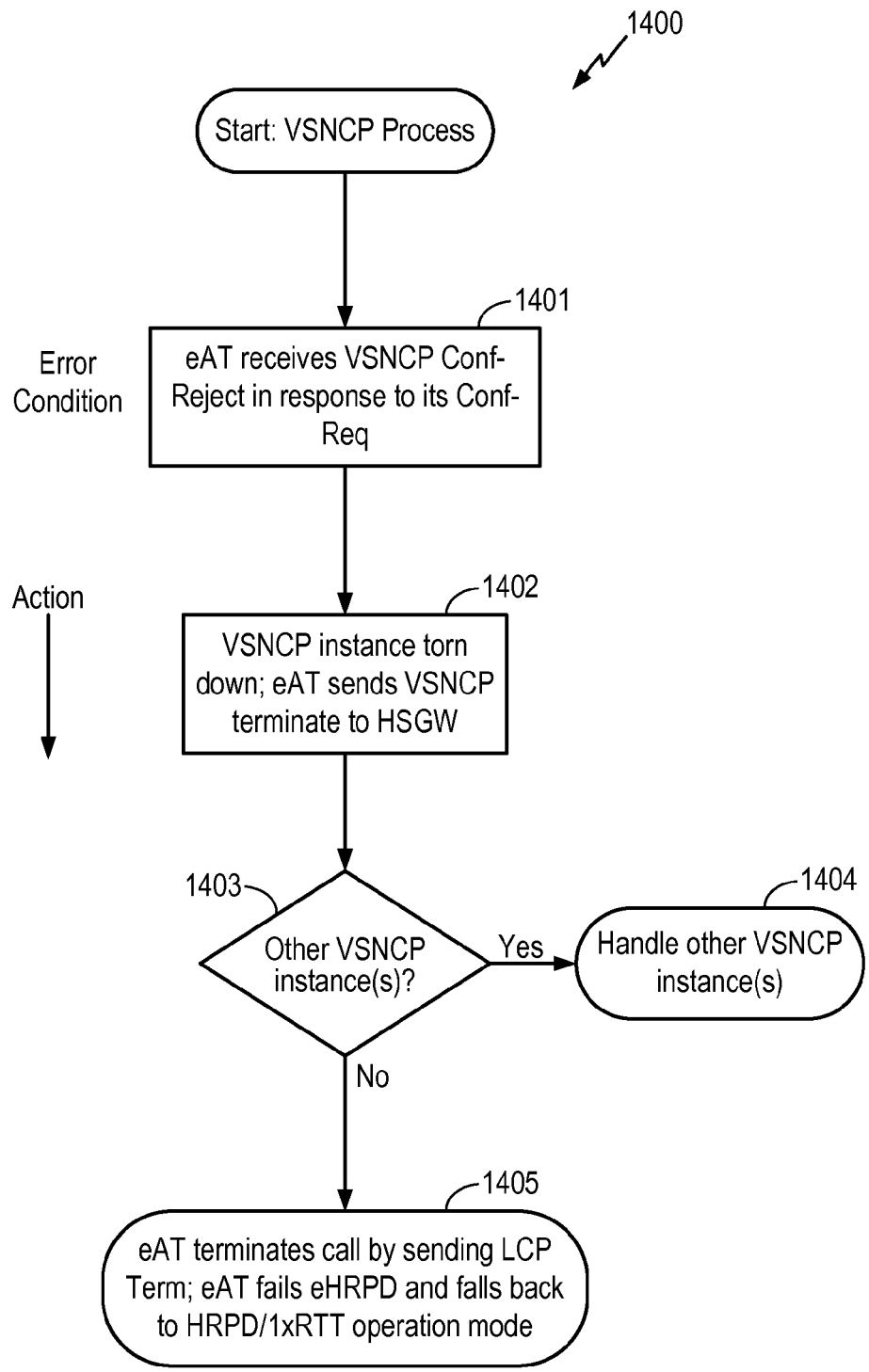

With reference to FIG. 14, in exemplary flow process 1400, the eAT receives a VSNCP Conf-Reject message in response to its Conf-Req (step 1401). In response to this error condition, eHRPD call tear down action is taken at steps 1402-1405, which are the same as steps 1102-1105 of FIG. 11.

Figure 15:
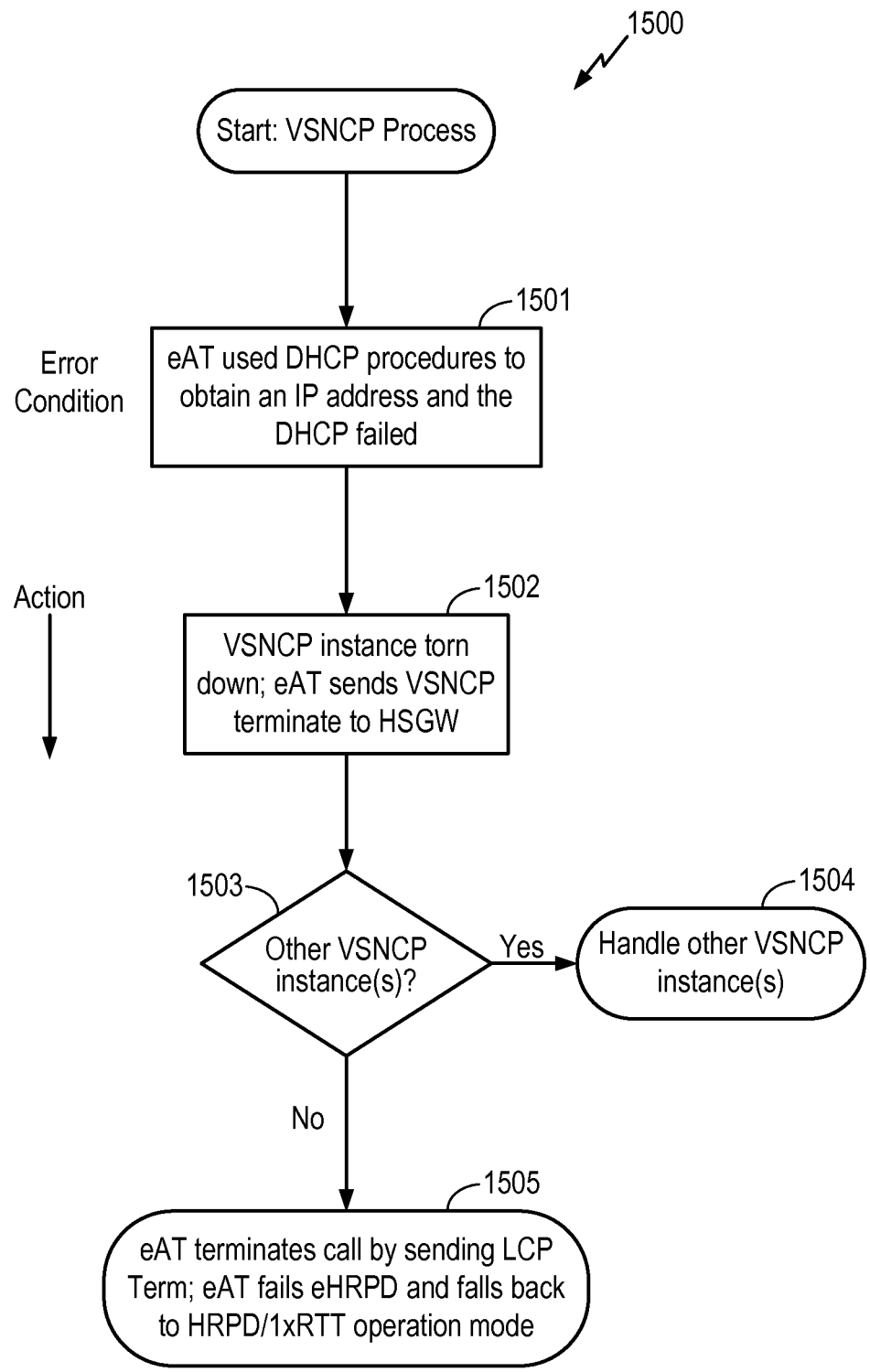

With reference to FIG. 15, in exemplary flow process 1500, an error condition occurs at step 1501 wherein the eAT used DHCP procedures to obtain an IP address, but the DHCP failed. The eHRPD call is then torn down at steps 1502-1505 in the same manner as steps 1102-1105 of FIG. 11.

Another error scenario is possible during a VSNCP process, in which the network does not provide a DNS server address. The eHRPD data call in this case is considered established. However, if the application cannot proceed without resolving a certain domain name, the application can subsequently tear down the call.

Yet another possible error condition may occur during a VSNCP process, in which the network does not provide a P-CSCF address/FQDN (Proxy Call/Session Control Function address/Fully Qualified Domain Name). In this case, the eHRPD data call is likewise considered established. However, if the application cannot proceed without P-CSCF address/FQDN, the application can subsequently tear down the call.

Figure 16:
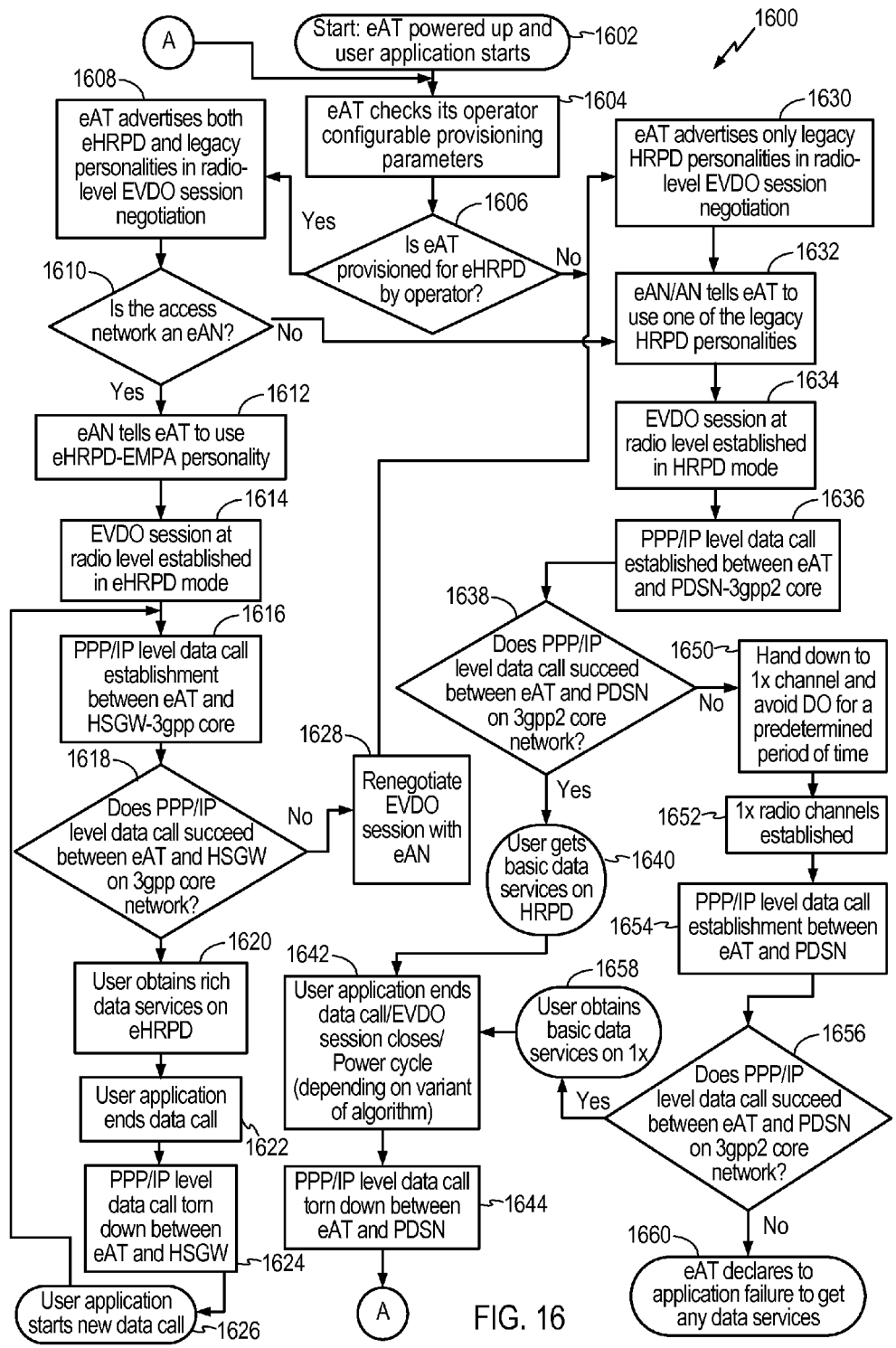
FIG. 16 illustrates an exemplary flow process in accordance with an embodiment in which an eHRPD data call attempt may fall back to either a HRPD or a 1xRTT data call.

FIG. 16 illustrates an exemplary flow process 1600 in accordance with an embodiment in which an eHRPD data call attempt may fall back to either a HRPD or a 1xRTT data call. The process starts at 1602 when an eAT is powered up and a user application starts. At 1604 the eAT checks its operator configurable provisioning parameters. If the eAT is provisioned for eHRPD by the operator at 1606, then the flow proceeds to 1608. In other words, the eAT may have eHRPD capability, but in some cases the network operator does not allow the eAT to use its eHRPD capability—in this case, the eAT is not "provisioned" for eHRPD. By way of example, a service provider (network operator) may sell the same model wireless device with an eHRPD chipset and software to two different users (first and second devices sold to first and second users, respectively). The service provider, however, may only allow eHRPD access to premium subscribers. Thus, the service provider, at the time the wireless device is sold, can enable (turn on) the eHRPD configuration in the first device, if the first user is a premium subscriber, and disable it in the second device if the second user has just a basic subscription. Hence the first user's eAT is provisioned for eHRPD operation whereas the second user's eAT is not. As another example, the same model wireless device with the eHRPD chipset/software may be sold to first and second service providers, but only the first service provider is providing eHRPD services to its customers. The first service provider enables the configuration item for all of the devices of this model, whereas the second service provider does not.

Accordingly, if the device application verifies operator provisioned eHRPD capability at 1606, then at 1608, the eAT advertises both eHRPD and legacy HRPD personalities in a radio-level EVDO session negotiation. Thereafter, at 1610 the eAT ascertains via network messaging if the access network is an eAN. If so, at 1612 the eAN instructs the eAT to use the eHRPD-EMPA personality. Next, at 1614, an EVDO session at the radio level is established in eHRPD mode. The flow then moves to 1616 where a PPP/IP level data call establishment between the eAT and the HSGW-3gpp core is attempted. If this call succeeds at 1618, the user obtains rich data services via eHRPD mode at 1620. Eventually, a user application ends the data call at 1622, whereupon the PPP/IP level data call is torn down between the eAT and HSGW at 1624. When a user application starts a new data call at 1626 the flow process returns to 1616.

If at 1606 it is judged that the eAT is not provisioned for eAT by the operator, the flow proceeds to 1630. Here, the eAT pretends it's an AT by advertising only legacy HRPD personalities in radio-level session negotiation. In the following step 1632, the access network, even if has just AN (but not eAN) capability, instructs the eAT to use one of the legacy personalities. Step 1632 is also performed via process flow from step 1610, i.e., if the access network was not discerned to have eAN capability at 1610.

At this point, at 1634 an EVDO session at radio level is established in HRPD mode. Then at 1636, a PPP/IP level data call establishment is attempted between the eAT and the PDSN-3gpp2 core. Thus, the legacy PDSN pathway, rather than the eHRPD HSGW pathway, is employed in HRPD mode as explained earlier. If this PPP/IP level data call succeeds at 1638, the user obtains basic data services on HRPD at 1640. If not, i.e., if there is a failure in the HRPD mode, then at 1650, a hand down to a 1xRTT channel occurs and EVDO is avoided for a predetermined period of time, before there is a hand up attempt to HRPD. In this scenario, 1xRTT radio channels are established at 1652, whereupon PPP/IP level data call establishment between the eAT and PDSN is attempted at 1654. If this data call succeeds at 1656, the user obtains basic data services on 1xRTT at 1658. If not, then at 1660 the eAT declares to the application that a failure to obtain any data services has occurred.

As mentioned, at 1618, it is judged if the PPP/IP data call succeeded between the eAT and the HSGW on the 3GPP network. If, for example, any of the error conditions described earlier in connection with FIGS. 7-15 have occurred, a failure may be judged at 1618, whereby the flow proceeds to 1628. Here, the EVDO session between the eAT and eAN is re-negotiated. To this end, the eAT tears down the radio session call to re-attempt a data call in HRPD fallback mode, by performing the steps at 1630 et seq.

Once the user obtains basic data services on HRPD at 1640 or on 1xRTT at 1658, the eAT will eventually re-attempt to establish an eHRPD session to obtain the more advanced data services available through eHRPD. This may be accomplished in one of several ways. In general, the HRPD or 1xRTT mode continues until the EVDO session closes for any reason. Note that the session close itself can be initiated by the eAT or by the eAN/AN. In one embodiment, the next time the EVDO session is brought up, the eAT will start from the beginning and attempt eHRPD.

In another embodiment, the HRPD or 1xRTT mode of operation continues until the next power cycle of the eAT, whereupon the eAT re-attempts an eHRPD session. (It is noted that conventionally, an EVDO session is continued across power cycles.)

In another embodiment variant, the HRPD or 1xRTT operation mode continues until the data call is torn down by the application. After the data call is torn down and a predetermined period of time elapses to conclude that a data call is no longer needed by any application for the time being, the EVDO session is also closed and the eAT starts session negotiation from the beginning, i.e., attempting eHRPD.

In yet another embodiment variant, the eAT attempts to re-enter eHRPD mode of operation upon switching certain regions within the eHRPD/HRPD network. Examples include RouteUpdateTriggerCode based, or Subnet boundary change, potentially accounting for secondary color codes.

In still another embodiment variant, an eHRPD mode establishment attempt is made upon a user trigger to make simultaneous voice and data available on the wireless device 106.

Accordingly, in flow process 1600, following 1640 or 1658, the lower level protocol (HRPD or 1xRTT) based data service comes to an end at 1642 as the user application ends the data call, the EVDO session closes, a power cycle event occurs, the user triggers a simultaneous voice+data request, and/or a region switch transpires, depending on the embodiment variant. Following one or more of these events, at 1644 the PPP/IP level data call is torn down between the eAT and the PDSN, and the flow returns to 1604 where the eAT may then re-attempt eHRPD data services if properly provisioned. When the eAT re-negotiates for the session again, it will propose eHRPD capability allowing the eAN to provision eHRPD personality for the eAT. Note that the current network itself can just be HRPD capable; and once the eAT moves into a region where the network is eHRPD capable, the eHRPD personality can be added to the eAT.

Figure 17:
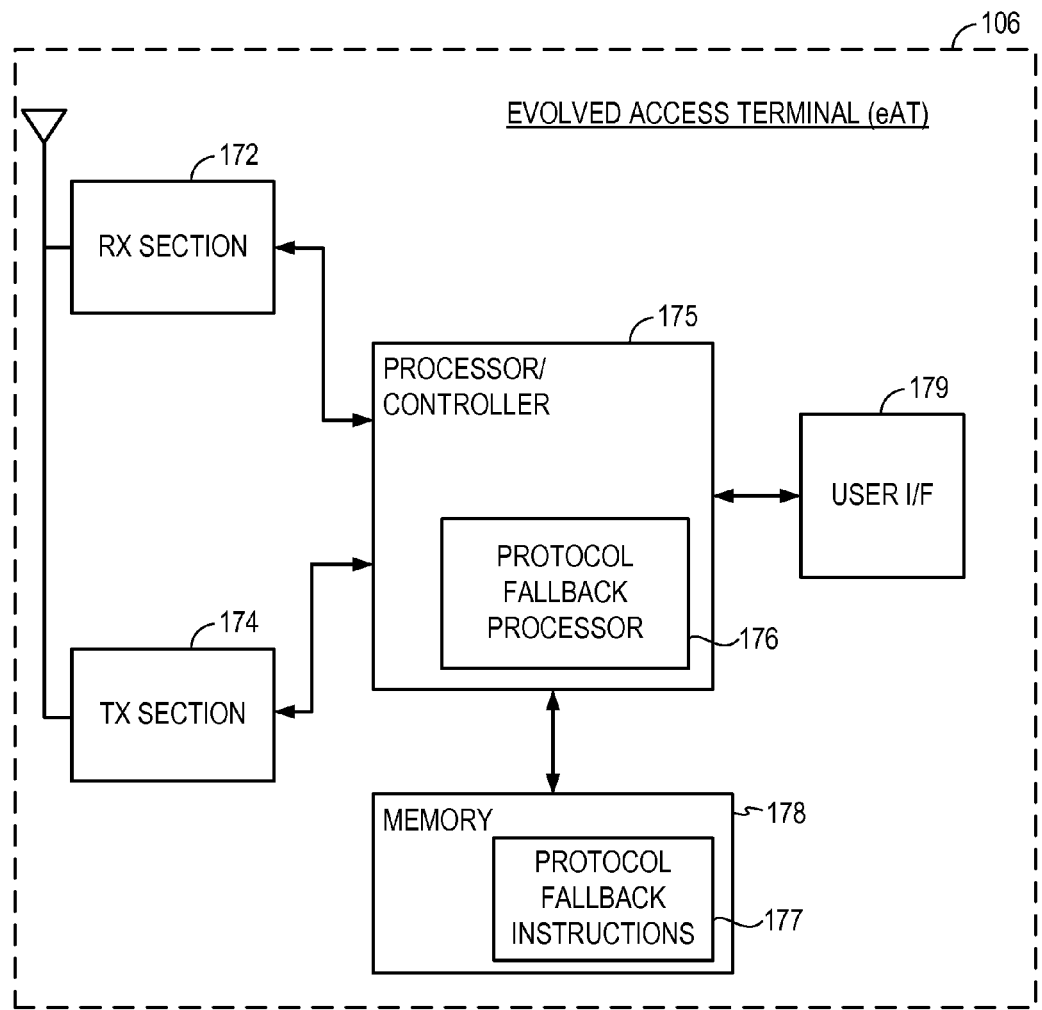
FIG. 17 is a functional block diagram of an embodiment of a wireless device that implements a protocol fallback technique in accordance with the disclosure.

FIG. 17 is a functional block diagram of an embodiment of a wireless device, shown as an eAT 106, that implements a protocol fallback technique in accordance with the disclosure. eAT 106 includes a processor/controller 175 that performs the processing and controls operations generally of eAT 106, by interacting with a user interface 179, a receive section 172, a transmit section 174 and a memory 178 in a known manner. A protocol fallback processor 176, shown as part of processor/controller 175, executes protocol fallback memory instructions 177 stored in memory 178. In alternative embodiments, fallback processor 176 and memory instructions 177 may be implemented as a software/firmware module running on a processor separate from processor 175. In either case, fallback processor 176, in conjunction with processor/controller 175 implements the relevant processing for the protocol fallback techniques described hereinabove, e.g., in the flow diagrams of FIGS. 4-16. Fallback processor 176 and memory instructions 177 may be implemented as an integrated circuit, along with portions or the entirety of processor/controller 175, user interface 179, memory 178, and receive and transmit sections 172, 174.

Figure 18:
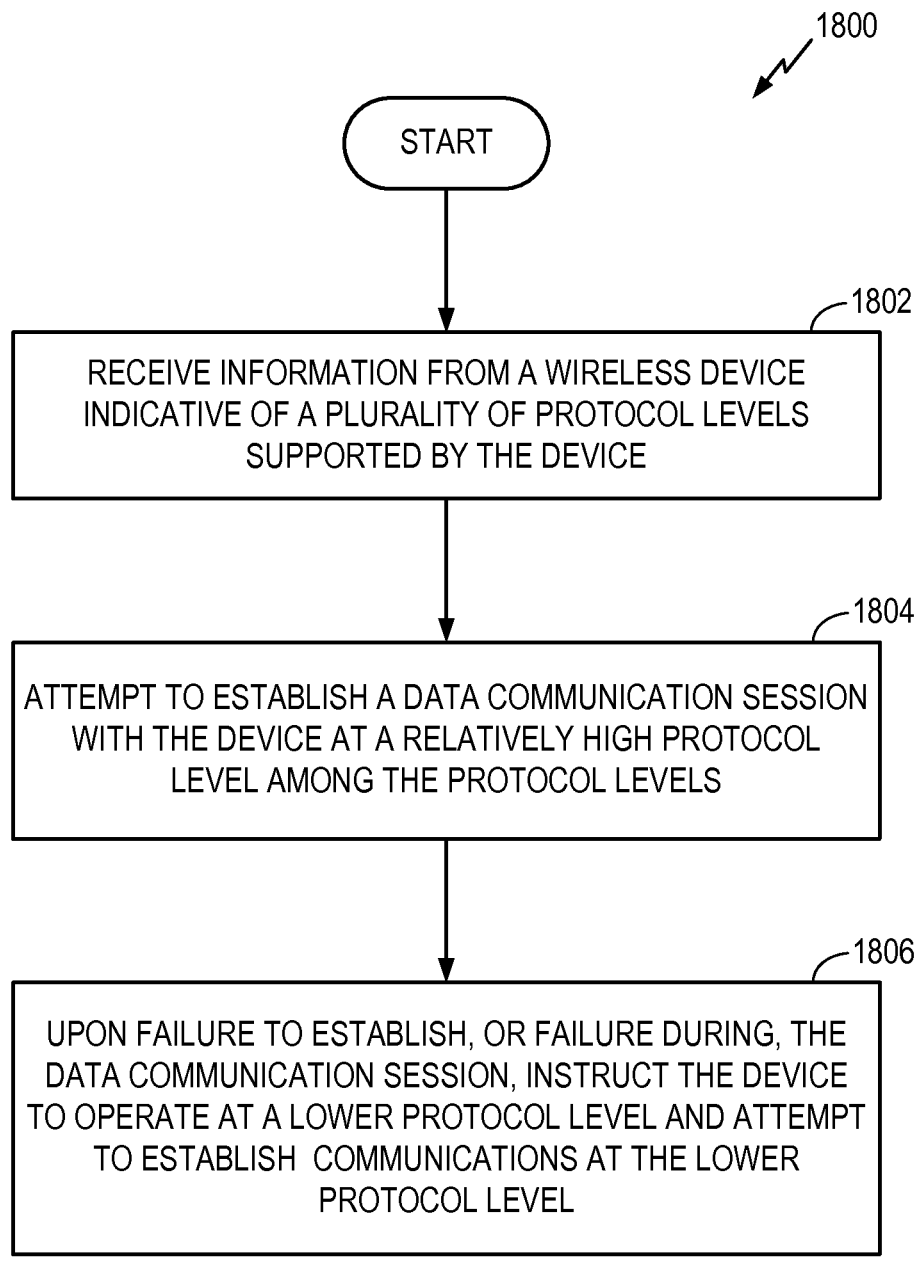
FIG. 18 is a diagram of an exemplary flow process performed by a network to implement protocol fallback in accordance with an alternative embodiment of the disclosure.

FIG. 18 is a diagram of an exemplary flow process 1800 performed by a network to implement protocol fallback in accordance with an alternative embodiment of the disclosure. In this embodiment, the onus is on the network, not the wireless device, to recognize the situation wherein the higher or highest level protocol is not possible and therefore a fallback to a lower level protocol is desired.

At step 1802, the network receives information from a wireless device such as an AT or eAT, which is indicative of a plurality of protocol levels supported by the wireless device. At step 1804, the network attempts to establish a data communication session with the device at a relatively high protocol level among the supported protocol levels. For instance, if the wireless device is an eAT and supports eHRPD as well as lower protocols as HRPD and 1xRTT, and the network also supports eHRPD, the network may instruct the device to operate at eHRPD protocol and attempt to establish a data session. At step 1806, if the data session fails to be established, or if a failure occurs during a successfully established data session, the network instructs the device to operate at a lower protocol level and attempt to initiate a data session. Accordingly, with flow process 1800, fallback is accomplished without the necessity of the wireless device pretending it is a legacy device.

Thus, with the network based approach, in the case of the eHRPD data session attempt, the HSGW could be configured to recognize the error condition situations. The HSGW may then communicate with the eAN through A11 signaling to ask the eAN to fail the eHRPD mode of operation. The eAN may then switch the eAT's personality to one of the classic HRPD personalities that the eAT had specified in its capabilities during initial session negotiation. From then on, the eAT will function as an AT until instructed otherwise by the eAN. Accordingly, in this alternative embodiment, the onus is on the network to determine when and for how long the eAT should operate in classic HRPD/1xRTT mode. As mentioned, with this option, the eAT does not pretend to be only a HRPD device to switch to an HRPD operating mode; it always indicates to be HRPD capable.

With the network approach of FIG. 18, in the eHRPD application the eAT capability may always be retained in the AN/eAN. The eAN, potentially based on interactions with the core network (HSGW), determines when the eAT will be provided an eHRPD personality and the operating mode switched to eHRPD (e.g., after operating at HRPD or 1xRTT due to a prior error condition and protocol fallback). Some of the possible triggers that the eAN can use to add the eHRPD personality to the eAT and attempt to switch to eHRPD are:

Subnet boundary change and UATI Request received from the eAT.
Subscription change trigger from the core network.
Timer based approach allowing the eAT to attempt eHRPD packet session establishment again. (The eAT re-attempts eHRPD packet session establishment after a predetermined period of time operating at HRPD or 1xRTT.)
Change in RAN (Radio Access Network).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another.

A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless communications device, comprising:
   at least one processor configured to:
   establish a radio level session with a network at a first protocol level among a plurality of protocol levels in a family of protocols supported by the network;
   terminate the established radio level session with the network upon detecting an error condition in establishing a network level session of the first protocol level;
   determine whether the error condition is recoverable upon a subsequent retry; and
   re-attempt to establish the radio level session and the network level session at a second protocol level via configuring the device to advertise an incapability of supporting the first protocol level upon determining the error condition is not recoverable or detecting a failure during the subsequent retry, wherein the first protocol level is a higher protocol level in the family of protocols and provides services that are an advancement over the services that are provided by the second protocol level among the plurality of protocol levels in the family of protocols.

2. The device of claim 1, wherein the at least one processor is further configured to:
   terminate the radio level session if the re-attempt to establish the network level session at the second protocol level fails; and
   re-attempt to establish the network level session at a third protocol level, wherein the third protocol level is a lower protocol level in the family of protocols and provides services that are less advanced than the services that are provided by the second protocol level among the plurality of protocol levels in the family of protocols.

3. The device of claim 1, wherein:
   the network level session at the first protocol level is a Point-to-Point Protocol/Internet Protocol (PPP/IP) level data session handled through an Access Network, an High Rate Packet Data Serving Gateway (HSGW) and a Packet Data Network (PDN) Gateway; and
   the network level session at the second protocol level is a PPP/IP level data session handled through the Access Network and a Packet Data Serving Node (PDSN).

4. The device of claim 3, wherein the radio level session is an Evolved High Rate Packet Data (eHRPD) type session, the first protocol level is an eHRPD protocol, and the second protocol level is an HRPD or one times Radio Transmission Technology (1xRTT) protocol.

5. The device of claim 4, wherein the radio level session is terminated upon detecting the error condition during an EAP-AKA' negotiation process.

6. The device of claim 4, wherein the radio level session is terminated upon detecting the error condition during a Fast re-authentication process.

7. The device of claim 4, wherein the radio level session is terminated upon detecting the error condition during a Vendor Specific Network Control Protocol (VSNCP) process.

8. The device of claim 7, wherein the error condition is a failure to provide an IPv4 or IPv6 address.

9. The device of claim 7, wherein the error condition occurs during a Dynamic Host Configuration Protocol (DHCP) procedure to obtain an IP address.

10. The device of claim 1, wherein the at least one processor is further configured to re-attempt to establish the network level session at the first protocol level upon a termination of the radio level session at the second protocol level.

11. The device of claim 1, wherein the at least one processor is further configured to re-attempt to establish the network level session at the first protocol level following a data call tear down by an application running on the device and a predetermined time period confirming that the data call is no longer needed by the application.

12. The device of claim 1, wherein the at least one processor is further configured to re-attempt to establish the network level session at the first protocol level based at least on a power cycle event of the device.

13. The device of claim 1, wherein the at least one processor is further configured to re-attempt to establish the network level session at the first protocol level upon switching into regions where the network is capable of supporting services at the first protocol level.

14. The device of claim 1, wherein the at least one processor is further configured to re-attempt to establish the network level session at the first protocol level upon a user trigger to select simultaneous voice and data service.

15. A method of data communication performed by a wireless communications device, comprising:
    establishing a radio level session with a network at a first protocol level among a plurality of protocol levels in a family of protocols supported by the network;
    terminating the established radio level session with the network upon detecting an error condition in establishing a network level session of the first protocol level;
    determining whether the error condition is recoverable upon a subsequent retry; and
    re-attempting to establish the radio level session and the network level session at a second protocol level via configuring the wireless device to advertise an incapability of supporting the first protocol level upon determining the error condition is not recoverable or detecting a failure during the subsequent retry, wherein the first protocol level is a higher protocol level in the family of protocols and provides services that are an advancement over the services that are provided by the second protocol level among the plurality of protocol levels in the family of protocols.

16. The method of claim 15, wherein:
    the network level session at the first protocol level is a Point-to Point/Internet Protocol (PPP/IP) level data session handled through an Access Network, an High Rate Packet Data Serving Gateway (HSGW) and a Packet Data Network (PDN) Gateway; and the network level session at the second protocol level is a PPP/IP level data session handled through the Access Network and a Packet Data Serving Node (PDSN).

17. An integrated circuit for use in a wireless communication device, the integrated circuit comprising:
at least one processor configured to:
establish a radio level session with a network at a first protocol level among a plurality of protocol levels in a family of protocols supported by the network;
terminate the established radio level session with the network upon detecting an error condition in establishing a network level session of the first protocol level;
determine whether the error condition is recoverable upon a subsequent retry; and
re-attempt to establish the radio level session and the network level session at a second protocol level upon determining the error condition is not recoverable or detecting a failure during the subsequent retry by configuring the wireless device to advertise an incapability of supporting the first protocol level, wherein the first protocol level is a higher protocol level in the family of protocols and provides services that are an advancement over the services that are provided by the second protocol level among the plurality of protocol levels in the family of protocols.

18. The integrated circuit of claim 17, wherein:
the network level session at the first protocol level is a Point-to-Point Protocol/Internet Protocol (PPP/IP) level data session handled through an Access Network, an High Rate Packet Data Serving Gateway (HSGW) and a Packet Data Network (PDN) Gateway; and
the network level session at the second protocol level is a PPP/IP level data session handled through the Access Network and a Packet Data Serving Node (PDSN).

19. At least one processor for use in a wireless communications device,
the at least one processor configured to:
establish a radio level session with a network at a first protocol level among a plurality of protocol levels in a family of protocols supported by the network;
terminate the established radio level session with the network upon detecting an error condition in establishing a network level session of the first protocol level;
determine whether the error condition is recoverable upon a subsequent retry; and
re-attempt to establish the radio level session and the network level session at a second protocol level by configuring the wireless device to advertise an incapability of supporting the first protocol level upon determining the error condition is not recoverable or detecting a failure during the subsequent retry, the first protocol level is a higher protocol level in the family of protocols and provides services that are an advancement over the services that are provided by the second protocol level among the plurality of protocol levels in the family of protocols.

20. The at least one processor of claim 19, wherein:
the network level session at the first protocol level is a Point-to-Point/Internet Protocol (PPP/IP) level data session handled through an Access Network, an High Rate Packet Data Serving Gateway (HSGW) and a Packet Data Network (PDN) Gateway; and
the network level session at the second protocol level is a PPP/IP level data session handled through the Access Network and a Packet Data Serving Node (PDSN).

21. A computer program product stored on a non-transitory computer-readable medium including instructions for causing a wireless communications device to:
establish a radio level session with a network at a first protocol level among a plurality of protocol levels in a family of protocols supported by the network;
terminate the established radio level session with the network upon detecting an error condition in establishing a network level session of the first protocol level;
determine whether the error condition is recoverable upon a subsequent retry; and
re-attempt to establish the radio level session and the network level session at a second protocol level by configuring the wireless device to advertise an incapability of supporting the first protocol level upon determining the error condition is not recoverable or detecting a failure during the subsequent retry, the first protocol level is a higher protocol level in the family of protocols and provides services that are an advancement over the services that are provided by the second protocol level among the plurality of protocol levels in the family of protocols.

22. The computer program product of claim 21, wherein:
the network level session at the first protocol level is a Point-to-Point/Internet Protocol (PP/IP) level data session handled through an Access Network, an High Rate Packet Data Serving Gateway (HSGW) and a Packet Data Network (PDN) Gateway; and
the network level session at the second protocol level is a PPP/IP level data session handled through the Access Network and a Packet Data Serving Node (PDSN).

23. A wireless communications device comprising:
means for establishing a radio level session with a network at a first protocol level among a plurality of protocol levels in a family of protocols supported by the network;
means for terminating the established radio level session with the network upon detecting an error condition in establishing a network level session of the first protocol level;
means for determining whether the error condition is recoverable upon a subsequent retry; and
means for re-attempting to establish the radio level session and the network level session at a second protocol level via configuring the device to advertise an incapability of supporting the first protocol level upon determining the error condition is not recoverable or detecting a failure during the subsequent retry, the first protocol level is a higher protocol level in the family of protocols and provides services that are an advancement over the services that are provided by the second protocol level among the plurality of protocol levels in the family of protocols.

24. The device of claim 23, further comprising:
means for terminating the radio level session if the re-attempt to establish the network level session at the second protocol level fails, and
means for then re-attempting to establish the network level session at a third protocol level, the third protocol level being less advanced than the second protocol level among the plurality of protocol levels.

25. The device of claim 23, wherein:
the network level session at the first protocol level is a Point-to-Point/Internet Protocol (PPP/IP) level data session handled through an Access Network, an High Rate Packet Data Serving Gateway (HSGW) and a Packet Data Network (PDN) Gateway; and
the network level session at the second protocol level is a PPP/IP level data session handled through the Access Network and a Packet Data Serving Node (PDSN).

26. A wireless communications device, comprising:
at least one processor configured to:
advertise a first protocol level capability for data communications among a plurality of protocol levels in a family of protocols;
attempt to establish a data communication session with the network at the first protocol level capability; and
if the attempt fails or the data communication session is established and then fails due to a detected error condition, re-attempt to establish data communication by exclusively advertising a capability of supporting a second protocol level, wherein the second protocol level is a lower protocol level and provides services that are less advanced than the services provided by the first protocol level among the plurality of protocol levels in the family of protocols.

27. The device of claim 26, wherein the first protocol level is an Evolved High Rate Packet Data (eHRPD) protocol, and the second protocol level is an HRPD or one times Radio Transmission Technology (1xRTT) protocol.

28. A network component of a wireless communication system, comprising:
means for receiving information from a wireless device indicative of a plurality of protocol levels in a family of protocols supported by the device;
means for attempting to establish a data communication session with the device at a first protocol level among the plurality of protocol levels;
means, upon failure to establish or failure during the data communication session due to a detected error condition, for receiving, from the device, an indication of exclusively supporting a second protocol level, wherein the second protocol level is a lower protocol level and provides services that are less advanced than the services provided by the first protocol level among the plurality of protocol levels in the family of protocols; and
means for instructing the device to operate at the second protocol level and for attempting to establish communications at the second protocol level.

29. The network component of claim 28, comprising one or more of an High Rate Packet Data Serving Gateway (HSGW) and an evolved Access Node in an Evolved High Rate Packet Data (eHRPD) communication system.

30. The network component of claim 28, wherein the first protocol level is an eHRPD protocol, and the second protocol level is an HRPD or one times Radio Transmission Technology (1xRTT) protocol.

31. The network component of claim 28, further comprising means, following operation at the second protocol level, for attempting to switch to operation at the first protocol level upon a trigger condition of: a subnet boundary change; a subscription change; a predetermined time period of the second protocol level operation elapsing; and/or a change in RAN.

32. A method performed by a network of a wireless communication system, comprising:
receiving information from a wireless device indicative of a plurality of protocol levels in a family of protocols supported by the device;
attempting to establish a data communication session with the device at a first protocol level among the plurality of protocol levels;
upon failure to establish, or failure during, the data communication session due to a detected error condition, receiving, from the device, an indication of exclusively supporting a second protocol level, wherein the second protocol level is a lower protocol level and provides services that are less advanced than the services provided by the first protocol level among the plurality of protocol levels in the family of protocols; and
instructing the device to operate at the second protocol level and attempting to establish communications at the second protocol level.

33. The method of claim 32, wherein the first protocol level is an Evolved High Rate Packet Data (eHRPD) protocol, and the second protocol level is an HRPD or one times Radio Transmission Technology (1xRTT) protocol.

34. A computer program product stored on a non-transitory computer-readable medium including instructions for causing a network of a wireless communications system to:
receive information from a wireless device indicative of a plurality of protocol levels in a family of protocols supported by the device;
attempt to establish a data communication session with the device at a first protocol level among the plurality of protocol levels;
upon failure to establish, or failure during, the data communication session due to a detected error condition, receive, from the device, an indication of exclusively supporting a second protocol level, wherein the second protocol level is a lower protocol level and provides services that are less advanced than the services provided by the first protocol level among the plurality of protocol levels in the family of protocols; and
instruct the device to operate at the second protocol level and attempt to establish communications at the second protocol level.

35. The computer program product of claim 34, wherein the first protocol level is an Evolved High Rate Packet Data (eHRPD) protocol, and the second protocol level is an HRPD or one times Radio Transmission Technology (1xRTT) protocol.

* * * * *